(12) United States Patent
Tsukamoto et al.

(10) Patent No.: US 8,441,687 B2
(45) Date of Patent: May 14, 2013

(54) IMAGE PROCESSING APPARATUS, IMAGE PROCESSING METHOD, AND PROGRAM

(75) Inventors: Makoto Tsukamoto, Kanagawa (JP); Jun Hirai, Tokyo (JP); Ayataka Nishio, Kanagawa (JP); Naomasa Takahashi, Chiba (JP)

(73) Assignee: Sony Corporation (JP)

( * ) Notice: Subject to any disclaimer, the term of this patent is extended or adjusted under 35 U.S.C. 154(b) by 588 days.

(21) Appl. No.: 12/733,414

(22) PCT Filed: Sep. 2, 2008

(86) PCT No.: PCT/JP2008/065716
§ 371 (c)(1),
(2), (4) Date: Feb. 24, 2010

(87) PCT Pub. No.: WO2009/031514
PCT Pub. Date: Mar. 12, 2009

(65) Prior Publication Data
US 2010/0165409 A1 Jul. 1, 2010

(30) Foreign Application Priority Data
Sep. 5, 2007 (JP) ................ P2007-229807

(51) Int. Cl.
*H04N 1/40* (2006.01)
*G06K 9/00* (2006.01)

(52) U.S. Cl.
USPC ............ 358/3.01; 358/3.04; 382/252

(58) Field of Classification Search ........ 358/3.01, 358/1.9, 3.04; 382/252; 345/616
See application file for complete search history.

(56) References Cited

U.S. PATENT DOCUMENTS

| 5,373,455 | A | 12/1994 | Edgar |
| 5,469,268 | A | 11/1995 | Neuhoff et al. |
| 6,510,252 | B1 * | 1/2003 | Kishimoto .................. 382/252 |
| 6,853,736 | B2 | 2/2005 | Miyake |
| 2007/0058202 | A1 | 3/2007 | Kakutani |

FOREIGN PATENT DOCUMENTS

| EP | 0516325 B1 | 3/1997 |
| EP | 0938064 A2 | 8/1999 |
| JP | 05-103204 A | 4/1993 |
| JP | 10327319 A | 12/1998 |
| JP | 11-003057 A | 1/1999 |

(Continued)

OTHER PUBLICATIONS

Hitoshi Kiya, "Good-understanding of Digital Image Processing," Jan. 2000, pp. 196-213.

(Continued)

*Primary Examiner* — Charlotte M Baker
(74) *Attorney, Agent, or Firm* — Lerner, David, Littenberg, Krumholz & Mentlik, LLP

(57) ABSTRACT

An image processing apparatus which may include a grayscale modulator forming a $\Delta\Sigma$ modulator. The modulator may include an adder that adds the pixel value of an image and an output of a feedback arithmetic unit, a quantizing unit that quantizes an output of the adder and outputs a quantized value including a quantization error as the result of $\Delta\Sigma$ modulation, a subtractor that calculates the quantization error, and the feedback arithmetic unit that filters the quantization error and outputs the filtering result to the adder. The filter coefficient of filtering by the feedback arithmetic unit may be determined such that the amplitude characteristics of noise shaping by the $\Delta\Sigma$ modulator in a frequency band that is equal to or more than an intermediate frequency band are the inverse characteristics of the spatial frequency characteristics of the human eye.

14 Claims, 18 Drawing Sheets

FOREIGN PATENT DOCUMENTS

| | | |
|---|---|---|
| JP | 2000-184196 A | 6/2000 |
| JP | 2001-339598 A | 12/2001 |
| JP | 2002-218239 A | 8/2002 |
| JP | 2002247391 A | 8/2002 |
| JP | 2004304658 A | 10/2004 |
| JP | 2005190239 A | 7/2005 |
| JP | 2007-106097 A | 4/2007 |
| JP | 2007-336144 A | 12/2007 |

OTHER PUBLICATIONS

Kite T D et al: "Digital halftoning as 2-D delta—Sigma modulation", Image Processing, 1997. Proceedings., International Conference on Santa Barbara, CA, USA Oct. 26-29, 1997, Los Alamitos, CA, USA, IEEE Comput. Soc, US vol. 1, Oct. 26, 1997, pp. 799-802, XP 010254077.

Supplementary European Search Report EP 08829685, dated Mar. 31, 2011.

Communication pursuant to Article 94 (3) EPC, from EP Application No. 08829685.0, dated Aug. 14, 2012.

Office Action from Japanese Application No. 2008-224319, dated Jun. 14, 2012.

* cited by examiner

A

B

A

B

A

B

A
g(1,1) = -0.0317
g(2,1) = -0.1267
g(3,1) = -0.1900
g(4,1) = -0.1267
g(5,1) = -0.0317
g(1,2) = -0.1267
g(2,2) = 0.2406
g(3,2) = 0.7345
g(4,2) = 0.2406
g(5,2) = -0.1267
g(1,3) = -0.1900
g(2,3) = 0.7345

B

A g(1,1) = -0.0249
g(2,1) = -0.0996
g(3,1) = -0.1494
g(4,1) = -0.0996
g(5,1) = -0.0249
g(1,2) = -0.0996
g(2,2) = 0.2248
g(3,2) = 0.6487
g(4,2) = 0.2248
g(5,2) = -0.0996
g(1,3) = -0.1494
g(2,3) = 0.6487

B

A g(1,1) = -0.0397
g(2,1) = -0.1586
g(3,1) = -0.2379
g(4,1) = -0.1586
g(5,1) = -0.0397
g(1,2) = -0.1586
g(2,2) = 0.2592
g(3,2) = 0.8356
g(4,2) = 0.2592
g(5,2) = -0.1586
g(1,3) = -0.2379
g(2,3) = 0.8356

B

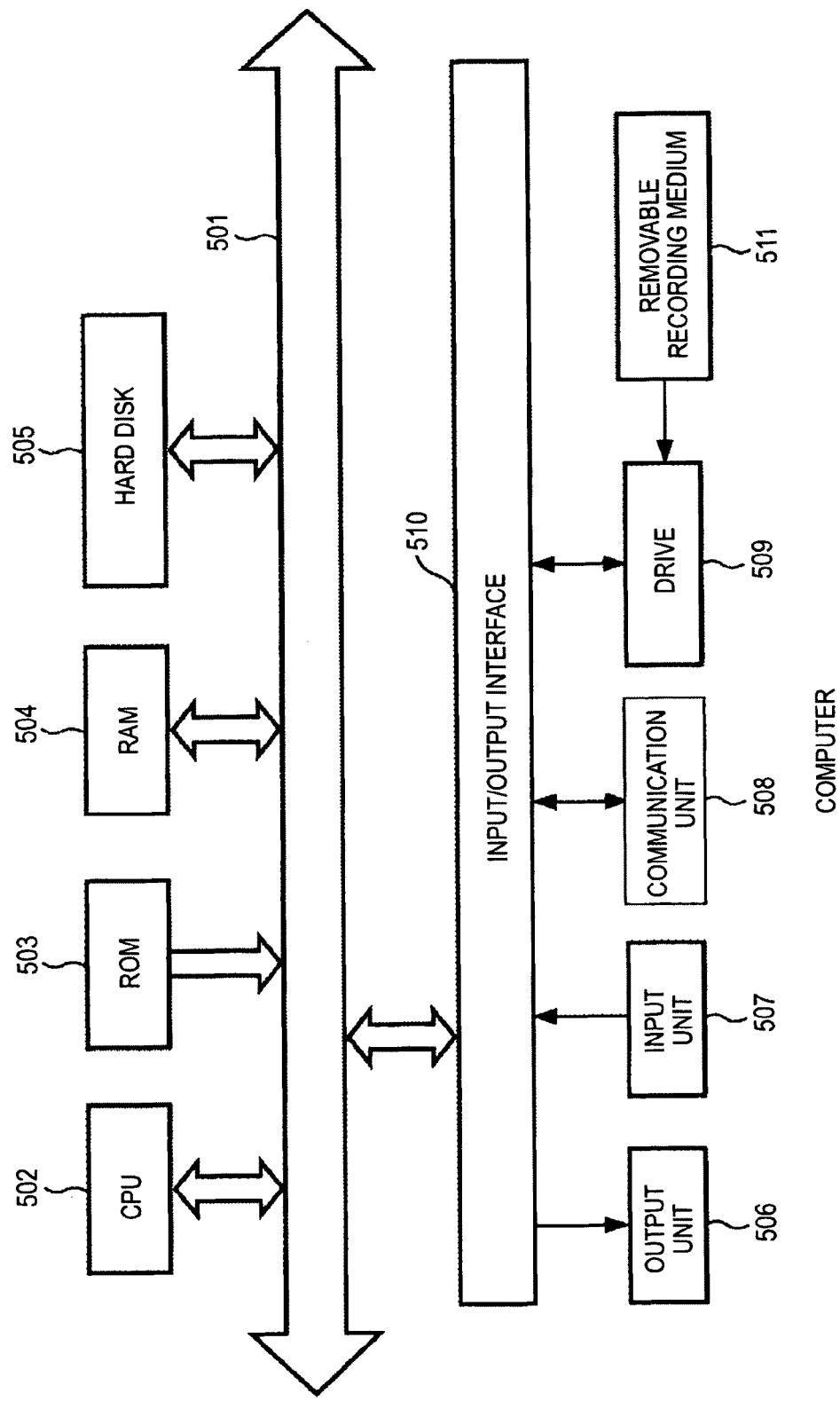

IMAGE PROCESSING APPARATUS, IMAGE PROCESSING METHOD, AND PROGRAM

CROSS-REFERENCES TO RELATED APPLICATIONS

The present application is a national phase entry under 35 U.S.C. §371 of International Application No. PCT/JP2008/065716 filed Sep. 2, 2008, published on Mar. 12, 2009 as WO 2009/031514 A1, which claims priority from Japanese Patent Application No. JP 2007-229807 filed in the Japanese Patent Office on Sep. 5, 2007.

TECHNICAL FIELD

The present invention relates to an image processing apparatus, an image processing method, and a program, and more particularly, to an image processing apparatus, an image processing method, and a program capable of improving the visual quality of an image after, for example, grayscale conversion.

BACKGROUND ART

For example, in order to display an image with an N-bit pixel value (hereinafter, referred to as an N-bit image) as an image with an M-bit pixel value smaller than N bits on a display device, it is necessary to convert the N-bit image into the M-bit image, that is, it is necessary to perform a grayscale conversion that converts the grayscale of an image.

As a method (grayscale conversion method) of converting the N-bit image into the M-bit image, for example, there is a method of cutting out the least significant N-M bits of the N-bit pixel value and quantizing the pixel value into an M-bit pixel value.

When an image signal is displayed on the display device, the quality of an image (image quality) is greatly affected by the quantization of the image signal. The quantization of the image signal is to approximate the pixel value of each pixel of the image signal to a value that can be represented by a predetermined amount of information. For example, when the pixel value of each pixel is represented by 8 bits, the least significant 4 bits are cut out, and the pixel value is quantized to the most significant 4 bits. In this way, it is possible to reduce the amount of data by half.

Next, a grayscale conversion method of cutting out the least significant N-M bits of the N-bit pixel value and quantizing the pixel value into an M-bit pixel value will be described with reference to FIGS. 1 and 2.

FIG. 1 shows an 8-bit grayscale image and pixel values on a horizontal line in the image.

A of FIG. 1 shows an example of the 8-bit grayscale image. The pixel value is not changed in the vertical direction, but the pixel value is gradually changed in the horizontal direction. B of FIG. 1 is a graph illustrating the pixel value shown in A of FIG. 1. In the graph, the horizontal axis indicates coordinates in the horizontal direction and the vertical axis indicates the pixel value at each coordinate. That is, in the 8-bit grayscale image, the level of the pixel value is gradually changed from 100 to 200 in the horizontal direction from the left to the right.

FIG. 2 shows an image obtained by cutting out the least significant 4 bits of the 8-bit grayscale image shown in FIG. 1 and quantizing the grayscale image into 4 bits and pixel values on a horizontal line in the image.

A of FIG. 2 shows an example of the image obtained by cutting out the least significant 4 bits of the 8-bit grayscale image shown in A of FIG. 1 and quantizing the grayscale image into the most significant 4 bits. In this case, a sharp variation in pixel value is clearly read from the grayscale image. B of FIG. 2 is a graph illustrating the pixel values shown in A of FIG. 2. In the graph, the horizontal axis indicates the coordinates in the horizontal direction and the vertical axis indicates the pixel value at each coordinate. As can be seen from the graph shown in B of FIG. 2, the pixel value is changes in sharply defined steps.

Here, 8 bits can represents $256 (=2^8)$ grayscale levels, but 4 bits can represent only $16 (=2^4)$ grayscale levels. Therefore, in the grayscale conversion of cutting out the least significant 4 bits of the 8-bit grayscale image and quantizing the grayscale image into the most significant 4 bits, banding occurs in which a variation in grayscale appears as a strip shape.

Therefore, for example, an error diffusion method has been proposed as a grayscale conversion method of preventing banding and representing the grayscale of an image before grayscale conversion in a pseudo manner in a grayscale-converted image, that is, a method of converting a 256 grayscale image into a 16 grayscale and visually representing 256 grayscale levels with 16 grayscale levels when a person views the image.

That is, only the method of simply cutting out the least significant bits is not sufficient to prevent a quantization error from being seen from the displayed image, and it is difficult to maintain a high image quality. As an error diffusion method, a method of performing $\Delta\Sigma$ modulation on an image has been known, in which the quantization error is modulated into a high frequency band considering human visual characteristics. In the error diffusion method, a two-dimensional filter that filters the quantization error is used. As the two-dimensional filter, the following filters have been known: a Jarvis-Judice-Ninke filter (hereinafter, referred to as a Jarvis filter); and a Floyd-Steinberg filter (hereinafter, referred to as a Floyd filter) (for example, see Non-patent Citation 1).

[Non-patent Citation 1] Kiya Hitoshi, 'Understanding Digital Image Processing', Sixth edition, CQ. Publications, January, 2000, pp. 196-213

DISCLOSURE OF INVENTION

Problems to be Solved by the Invention

When the display device has a sufficient resolution, the Jarvis filter and the Floyd filter can modulate the quantization error to a frequency band that human visual characteristics cannot perceive. However, when the display device does not have a sufficient resolution, it is difficult for the Jarvis filter or the Floyd filter to modulate the quantization error to the frequency band that human visual characteristics cannot perceive.

That is, FIG. 3 shows the spatial frequency characteristics (visual characteristics) of the human eye and the characteristics (amplitude characteristics) of noise shaping by the $\Delta\Sigma$ modulation of the Jarvis filter and the Floyd filter.

In FIG. 3, characteristics 710 indicate visual characteristics. In addition, characteristics 721 indicate the characteristics of noise shaping by the Jarvis filter, and characteristics 722 indicate the characteristics of noise shaping by the Floyd filter.

In order to represent human visual characteristics, a contrast sensitivity curve is used in which the horizontal axis indicates a spatial frequency f [unit: cpd (cycle/degree)] and the vertical axis indicates contrast sensitivity. In this case, cpd indicates the number of strips per unit angle (angle of view: 1 degree) with respect to an angle of view. For example, 10 cpd means that 10 pairs of white lines and black lines are seen at an angle of view of 1 degree, and 20 cpd means that 20 pairs of white lines and black lines are seen at an angle of view of 1 degree.

If it is assumed that a high-resolution printer with a maximum frequency of about 120 cpd is used as the display device, both the Jarvis filter and the Floyd filter can modulate the quantization error to the frequency band that is hardly perceived by the human eye, as shown in A of FIG. 3.

However, if it is assumed that a high-definition display with a size of 1920 pixels by 1080 pixels is used as the display device, the maximum frequency per unit angle with respect to the angle of view is about 30 cpd. In this case, as shown in B of FIG. 3, it is difficult for either the Jarvis filter or the Floyd filter to modulate the quantization error to a frequency band in which sensitivity to the visual characteristics of the human is sufficient low. This is because a sampling frequency is determined by the resolution of the display device and the visual characteristics of the human have an eigenvalue.

As such, in the Jarvis filter or the Floyd filter, it is difficult to modulate the quantization error to a frequency band in which human visual sensitivity is sufficiently low. As a result, the visual quality of an image after grayscale conversion deteriorates.

When the quantization error is sufficiently modulated to a frequency band in which human visual sensitivity is low, a hunting phenomenon is likely to occur in which the output of the two-dimensional filter used in the error diffusion method diverges. In this case, the visual quality of an image after grayscale conversion also deteriorates.

The invention has been made in order to solve the above-mentioned problems, and an object of the invention is to provide a technique capable of improving the visual quality of an image after grayscale conversion.

Means for Solving the Problems

A first aspect of the invention provides an image processing apparatus comprising a $\Delta\Sigma$ modulation unit that performs $\Delta\Sigma$ modulation on an image to convert the grayscale of the image and a program that allows a computer to function as the image processing apparatus. The $\Delta\Sigma$ modulation unit includes: an arithmetic unit that filters a quantization error; an adding unit that adds a pixel value of the image and the output of the arithmetic unit; a quantizing unit that quantizes the output of the adding unit and outputs a quantized value including the quantization error as the result of the $\Delta\Sigma$ modulation; and a subtracting unit that calculates the difference between the output of the adding unit and the quantized value of the output of the adding unit, thereby calculating the quantization error. A filter coefficient of filtering by the arithmetic unit is determined such that the amplitude characteristics of noise shaping by the $\Delta\Sigma$ modulation unit in a high frequency band are the inverse characteristics of the spatial frequency characteristics of the human eye.

The first aspect of the invention also provides an image processing method performed in an image processing apparatus including a $\Delta\Sigma$ modulation unit that performs $\Delta\Sigma$ modulation on an image to convert the grayscale of the image. The $\Delta\Sigma$ modulation unit includes an arithmetic unit that filters a quantization error, an adding unit that adds a pixel value of the image and the output of the arithmetic unit, a quantizing unit that quantizes the output of the adding unit and outputs a quantized value including the quantization error as the result of the $\Delta\Sigma$ modulation, and a subtracting unit that calculates the difference between the output of the adding unit and the quantized value of the output of the adding unit, thereby calculating the quantization error. The image processing method includes the steps of: allowing the adding unit to add the pixel value of the image and the output of the arithmetic unit; allowing the quantizing unit to quantize the output of the adding unit and output the quantized value including the quantization error as the result of the $\Delta\Sigma$ modulation; allowing the subtracting unit to calculate the difference between the output of the adding unit and the quantized value of the output of the adding unit, thereby calculating the quantization error; and allowing the arithmetic unit to filter the quantization error and output the filtering result to the adding unit. A filter coefficient of filtering by the arithmetic unit is determined such that the amplitude characteristics of noise shaping by the $\Delta\Sigma$ modulation unit in a high frequency band are the inverse characteristics of the spatial frequency characteristics of the human eye.

In the above-mentioned first aspect, the adding unit adds the pixel value of the image and the output of the arithmetic unit, and the quantizing unit quantizes the output of the adding unit and outputs the quantized value including the quantization error as the result of the $\Delta\Sigma$ modulation. The subtracting unit calculates the difference between the output of the adding unit and the quantized value of the output of the adding unit, thereby calculating the quantization error. The arithmetic unit filters the quantization error and output the filtering result to the adding unit. In this case, the filter coefficient of filtering by the arithmetic unit is determined such that the amplitude characteristics of noise shaping by the $\Delta\Sigma$ modulation unit in the high frequency band are the inverse characteristics of the spatial frequency characteristics of the human eye.

A second aspect of the invention provides an image processing apparatus and a program that allows a computer to function as the image processing apparatus. The image processing apparatus includes: an identity detecting unit that detects whether a pixel value of an interesting pixel is identical to a pixel value of a pixel around the interesting pixel in an image; a noise generating unit that generates a random noise; a first adding unit that adds the random noise to the pixel value of the interesting pixel and outputs the added value as the pixel value of the interesting pixel when it is detected that the pixel values are identical to each other, and outputs the pixel value of the interesting pixel without any change in other cases; and a $\Delta\Sigma$ modulation unit that performs $\Delta\Sigma$ modulation on the image to convert the grayscale of the image. The $\Delta\Sigma$ modulation unit includes: an arithmetic unit that filters a quantization error; a second adding unit that adds the pixel value of the interesting image output from the first adding unit and the output of the arithmetic unit; a quantizing unit that quantizes the output of the second adding unit and outputs a quantized value including the quantization error as the result of the $\Delta\Sigma$ modulation; and a subtracting unit that calculates the difference between the output of the second adding unit and the quantized value of the output of the second adding unit, thereby calculating the quantization error.

The second aspect of the invention also provides an image processing method performed in an image processing apparatus including an identity detecting unit that detects whether a pixel value of an interesting pixel is identical to a pixel value of a pixel around the interesting pixel in an image, a noise generating unit that generates a random noise, a first adding unit that adds the random noise to the pixel value of the interesting pixel and outputs the added value as the pixel value of the interesting pixel when it is detected that the pixel values are identical to each other and outputs the pixel value of the interesting pixel without any change in the other cases, and a $\Delta\Sigma$ modulation unit that performs $\Delta\Sigma$ modulation on the image to convert the grayscale of the image. The ΔΣ modulation unit includes an arithmetic unit that filters a quantization error, a second adding unit that adds the pixel value of the interesting image output from the first adding unit and the output of the arithmetic unit, a quantizing unit that quantizes the output of the second adding unit and outputs a quantized value including the quantization error as the result of the ΔΣ modulation, and a subtracting unit that calculates the difference between the output of the second adding unit and the quantized value of the output of the second adding unit, thereby calculating the quantization error. The image processing method includes the steps of: allowing the first adding unit to add the random noise to the pixel value of the interesting pixel and output the added value as the pixel value of the interesting pixel when it is detected that the pixel values are identical to each other, and to output the pixel value of the interesting pixel without any change in the other cases; allowing the second adding unit to add the pixel value of the interesting image output from the first adding unit and the output of the arithmetic unit; allowing the quantizing unit to quantize the output of the second adding unit and output the quantized value including the quantization error as the result of the ΔΣ modulation; allowing the subtracting unit to calculate the difference between the output of the second adding unit and the quantized value of the output of the second adding unit, thereby calculating the quantization error; and allowing the arithmetic unit to filter the quantization error and output the filtering result to the second adding unit.

In the above-mentioned second aspect, the first adding unit adds the random noise to the pixel value of the interesting pixel and outputs the added value as the pixel value of the interesting pixel when it is detected that the pixel values are identical to each other, and outputs the pixel value of the interesting pixel without any change in the other cases. The second adding unit adds the pixel value of the interesting image output from the first adding unit and the output of the arithmetic unit. The quantizing unit quantizes the output of the second adding unit and outputs the quantized value including the quantization error as the result of the ΔΣ modulation. The subtracting unit calculates the difference between the output of the second adding unit and the quantized value of the output of the second adding unit, thereby calculating the quantization error. The arithmetic unit filters the quantization error and outputs the filtering result to the second adding unit.

The image processing apparatus may be an independent apparatus or an internal block of one apparatus.

The program may be transmitted through a transmission medium, or it may be recorded on a recording medium and then provided.

ADVANTAGEOUS EFFECTS

According to the first and second aspects of the invention, it is possible to improve the visual quality of an image after grayscale conversion.

BRIEF DESCRIPTION OF DRAWINGS

FIG. 18 is a block diagram illustrating an example of a computer according to an embodiment of the invention.

EXPLANATION OF REFERENCE

100: STABILIZER
110: FIXED VALUE DETECTING UNIT
111: CORRECTED PIXEL VALUE SUPPLY UNIT
118: AND OPERATOR
120: RANDOM NOISE GENERATING UNIT
130: SWITCH
140: ADDER
200: GRAYSCALE MODULATOR
210: QUANTIZER
220: DEQUANTIZER
230: SUBTRACTOR
240: FEEDBACK ARITHMETIC UNIT
241: QUANTIZATION ERROR SUPPLY UNIT
248, 250: ADDER
501: BUS
502: CPU
503: ROM
504: RAM
505: HARD DISK
506: OUTPUT UNIT
507: INPUT UNIT
508: COMMUNICATION UNIT
509: DRIVE
510: INPUT/OUTPUT INTERFACE
511: REMOVABLE RECORDING MEDIUM
1111: MEMORY
1114: WRITE UNIT
1115, 1116: READ UNIT
1121 TO 1132: DELAY ELEMENT

1161 TO 1172: COMPARATOR
2411: MEMORY
2414: WRITE UNIT
2415, 2416: READ UNIT
2421 TO 2432: DELAY ELEMENT
2461 TO 2472: MULTIPLIER

BEST MODE FOR CARRYING OUT THE INVENTION

Hereinafter, exemplary embodiments of the invention will be described in detail with reference to the accompanying drawings.

[Example of Overall Structure of Image Processing Apparatus]

Figure 4:
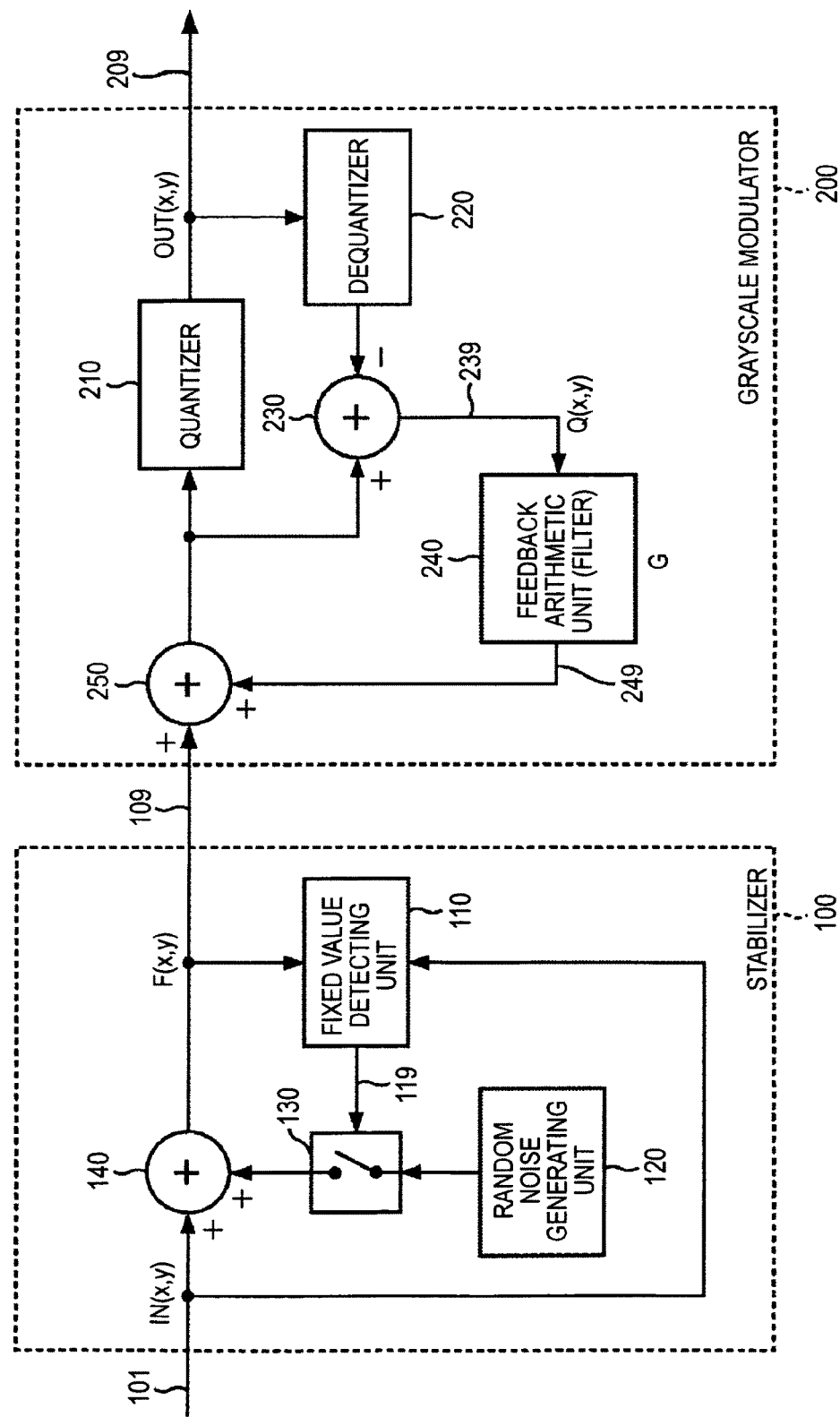
FIG. 4 is a block diagram illustrating an example of the structure of an image processing apparatus according to an embodiment of the invention.

FIG. 4 is a diagram illustrating an example of the structure of an image processing apparatus according to an embodiment of the invention.

The image processing apparatus is a grayscale converting apparatus that receives a two-dimensional image signal as an input signal IN(x, y) from a signal line 101 and outputs an output signal OUT(x, y) from a signal line 209, and includes a stabilizer 100 and a grayscale modulator 200.

The grayscale modulator 200 forms a ΔΣ modulator and has a noise shaping effect for modulating a quantization error (quantization noise) in a high frequency range. In the embodiment of the invention, the noise shaping characteristics of the ΔΣ modulator are determined such that the quantization error is sufficiently modulated to a frequency band that is hardly perceived by the human eye even when a maximum frequency per unit angle with respect to an angle of view is about 30 cpd. Therefore, a hunting phenomenon occurs in which the ΔΣ modulator diverges. The hunting phenomenon is likely to occur when the same data is continuously input. In order to prevent the hunting phenomenon, the stabilizer 100 is provided in the image processing apparatus and a very small amount of noise is applied such that the ΔΣ modulator does not diverge when the same data is continuously input.

The stabilizer 100 includes a fixed value detecting unit 110, a random noise generating unit 120, a switch 130, and an adder 140. The grayscale modulator 200 includes a quantizer 210, a dequantizer 220, a subtractor 230, a feedback arithmetic unit 240, and an adder 250. The output of the stabilizer 100 is output as a corrected signal F(x, y) to the signal line 109 and is then input to the grayscale modulator 200.

The fixed value detecting unit 110 determines whether the input signal IN(x, y) has the same data as the previously corrected signal F(x, y) and detects whether the same data is continuously input as a fixed value. The input signal IN(x, y) is the pixel value of a pixel at a position (x, y) in an image whose grayscale will be converted.

The random noise generating unit 120 generates random noise. The noise level of the random noise depends on a filter coefficient of the feedback arithmetic unit 240 of the grayscale modulator 200.

The switch 130 is turned on or off by the fixed value detecting unit 110. When the fixed value detecting unit 110 detects the fixed value, the switch 130 supplies the random noise generated by the random noise generating unit 120 to the adder 140. In the other cases, the switch 130 does not supply the random noise to the adder 140.

The adder 140 adds the input signal IN(x, y) and the output of the switch 130. When the random noise is supplied from the switch 130, the adder 140 adds the random noise to the input signal IN(x, y) and outputs the added value as a corrected signal F(x, y). When no random noise is supplied from the switch 130, the adder 140 outputs the input signal IN(x, y) as the corrected signal F(x, y) without any change.

The quantizer 210 quantizes the output of the adder 250. For example, when 12-bit data is input from the adder 250 and a display device (not shown) that displays a grayscale-converted image displays an 8-bit image, the quantizer 210 cuts out the least significant 4 bits and outputs the most significant 8 bits as an output signal OUT(x, y). The output signal OUT(x, y) is the pixel value of a pixel at the position (x, y) in the image subjected to grayscale conversion.

The dequantizer 220 dequantizes the output signal OUT(x, y) quantized by the quantizer 210. For example, when the quantized output signal OUT(x, y) is 8 bits, the dequantizer 220 pads the least significant 4 bits with '0000' (padding), and outputs 12-bit data which is the same as that of the input signal IN(x, y).

The subtractor 230 calculates the difference between the output of the adder 250 and the output of the dequantizer 220. The subtractor 230 subtracts the output of the dequantizer 220 from the output of the adder 250 and outputs a quantization error Q(x, y) cut out by the quantizer 210 to a signal line 239.

The feedback arithmetic unit 240 is, for example, a two-dimensional filter that filters the previous quantization error Q(x, y) output from the subtractor 230, and may be composed of, for example, a FIR (finite impulse response) filter.

That is, the feedback arithmetic unit 240 multiplies the previous quantization error Q(x, y) output from the subtractor 230 by, for example, a predetermined filter coefficient and adds the obtained values. A value calculated by the product-sum operation of the feedback arithmetic unit 240, that is, the filtering result of the quantization error, is supplied as a feedback value to the adder 250.

The adder 250 is for feeding back the feedback value calculated by the feedback arithmetic unit 240 to the corrected signal F(x, y) input to the grayscale modulator 200. The adder 250 adds the corrected signal F(x, y) input to the grayscale modulator 200 and the feedback value calculated by the feedback arithmetic unit 240, and outputs the added value to the quantizer 210 and the subtractor 230.

In the image processing apparatus, the corrected signal F(x, y) input to the grayscale modulator 200 and the output signal OUT(x, y) output from the grayscale modulator 200 have an input/output relationship represented by the following expression.

$$OUT(x,y) = F(x,y) - (1-G) \times Q(x,y) \quad (1)$$

In Expression (1), G indicates a transfer function of the two-dimensional filter, which is the feedback arithmetic unit 240.

According to Expression (1), the quantization error Q(x, y) is modulated to a high frequency band by the noise shaping of a transfer function (1−G).

[Process Sequence of Pixels by Image Processing Apparatus]

Figure 5:
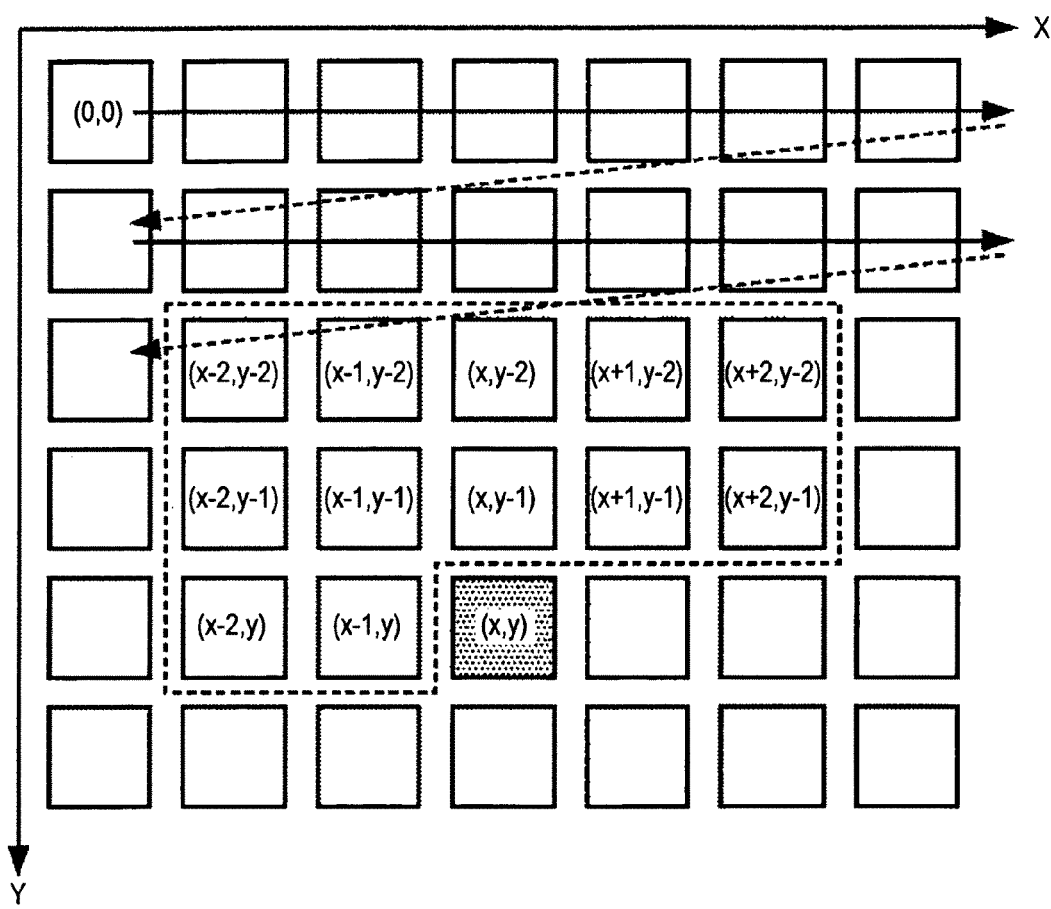
FIG. 5 is a diagram illustrating a process sequence of each pixel of an image signal.

FIG. 5 is a diagram illustrating a process sequence of each pixel of an image signal in the embodiment of the invention.

Here, the position (coordinates) of each pixel of the image signal is represented by a two-dimensional coordinate system in which (the center of) an upper left pixel is reference coordinates (the origin) (0, 0), the horizontal axis is the x axis, and the vertical axis is the y axis. In addition, it is assumed that the distance between adjacent pixels is 1.

The image processing apparatus shown in FIG. 4 processes the pixels of an image before grayscale conversion as interesting pixels, which are process targets, in a raster scan order from the left to the right and from the upper side to the lower side, as represented by arrows in FIG. 5. That is, input signals IN(0, 0), IN(1, 0), IN(2, 0), . . . , IN(0, 1), IN(1, 1), IN(2, 1), . . . are input in this order to the image processing apparatus.

In the fixed value detecting unit 110 or the feedback arithmetic unit 240, the raster scanning order is considered as a predetermined area when other pixels are referred to. For example, in the fixed value detecting unit 110, when the fixed value of the input signal IN(x, y) is detected, 12 corrected signals F(x−2, y−2), F(x−1, y−2), F(x, y−2), F(x+1, y−2), F(x+2, y−2), F(x−2, y−1), F(x−1, y−1), F(x, y−1), F(x+1, y−1), F(x+2, y−1), F(x−2, y), and F(x−1, y) in an area surrounded by a dotted line, that is, the previous corrected signals are referred to. Similarly, in the feedback arithmetic unit 240, when a feedback value corresponding to the corrected signal F(x, y) is calculated, 12 quantization errors Q(x−2, y−2), Q(x−1, y−2), Q(x, y−2), Q(x+1, y−2), Q(x+2, y−2), Q(x−2, y−1), Q(x−1, y−1), Q(x, y−1), Q(x+1, y−1), Q(x+2, y−1), Q(x−2, y), and Q(x−1, y) in the area surrounded in the dotted line, that is, the previous quantization errors are referred to.

When the image before grayscale conversion is color image signals including a brightness signal Y and color difference signals Cb and Cr, a grayscale conversion process is performed on each of the signals. That is, the grayscale conversion process is independently performed on the brightness signal Y, and the grayscale conversion process is also independently performed on the color difference signals Cb and Cr.

[Example of Structure of Fixed Value Detecting Unit 110]

Figure 6:
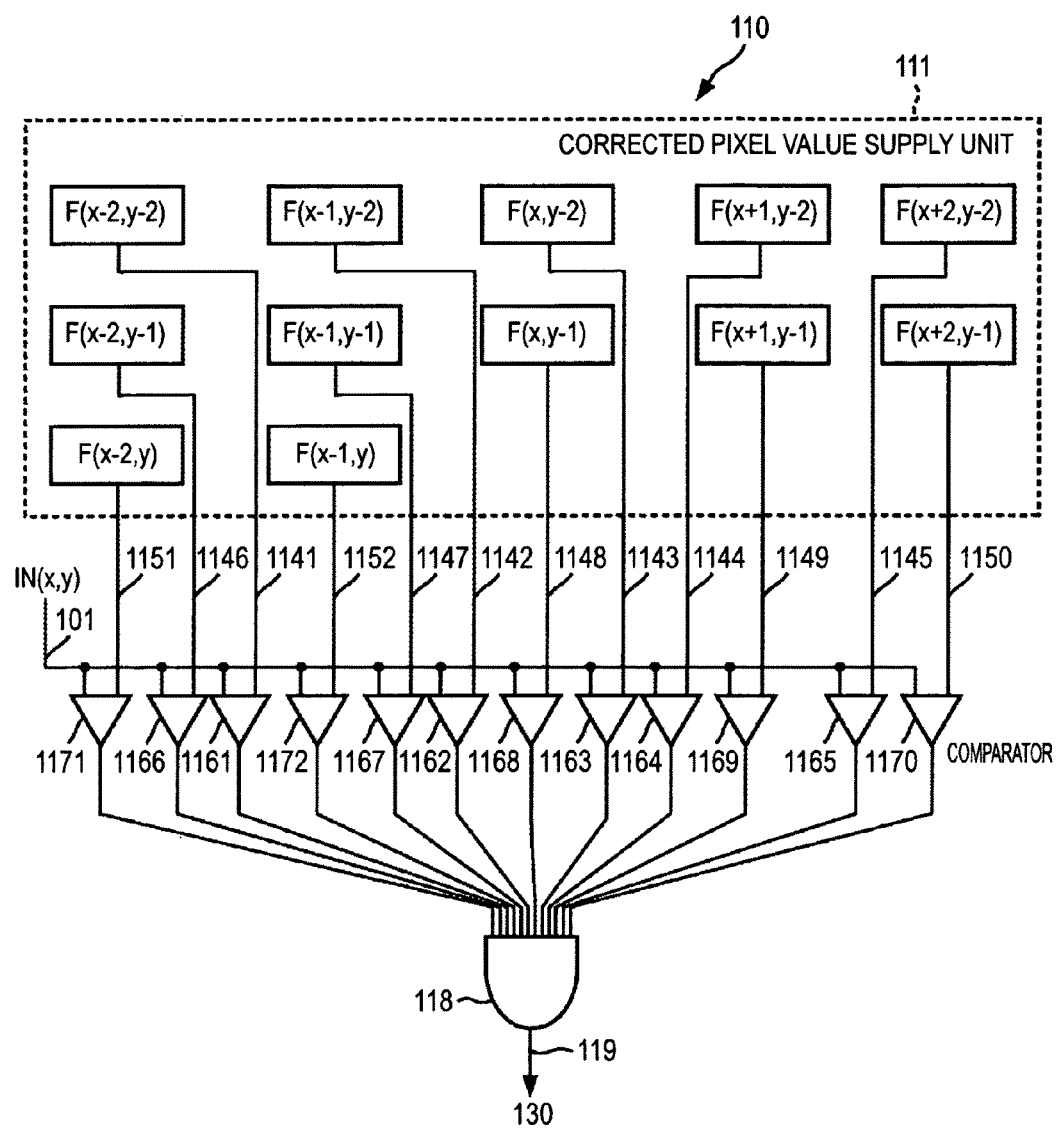
FIG. 6 is a block diagram illustrating an example of the structure of a fixed value detecting unit 110.

FIG. 6 is a diagram illustrating an example of the structure of the fixed value detecting unit 110 shown in FIG. 4.

The fixed value detecting unit 110 includes a corrected pixel value supply unit 111, comparators 1161 to 1172, and an AND operator 118.

The corrected pixel value supply unit 111 supplies the previous pixel value of the corrected signal F(x, y). In this example, it is assumed that 12 corrected signals F(x−2, y−2), F(x−1, y−2), F(x, y−2), F(x+1, y−2), F(x+2, y−2), F(x−2, y−1), F(x−1, y−1), F(x, y−1), F(x+1, y−1), F(x+2, y−1), F(x−2, y) and F(x−1, y) are supplied.

The comparators 1161 to 1172 compare the pixel values of the corrected signals F supplied from the corrected pixel value supply unit 111 with the input signal IN(x, y) and detect whether they are identical to each other.

The AND operator 118 is an AND gate that performs an AND operation on the outputs of the comparators 1161 to 1172. That is, when all of the comparators 1161 to 1172 detect that the pixel value and the input signal are identical to each other, the AND operator 118 outputs a true value '1' to a signal line 119. When no comparator detects that the pixel value and the input signal are identical to each other, the AND operator 118 outputs a true value '0' to the signal line 119.

[Example of Structure of Corrected Pixel Value Supply Unit 111]

Figure 7:
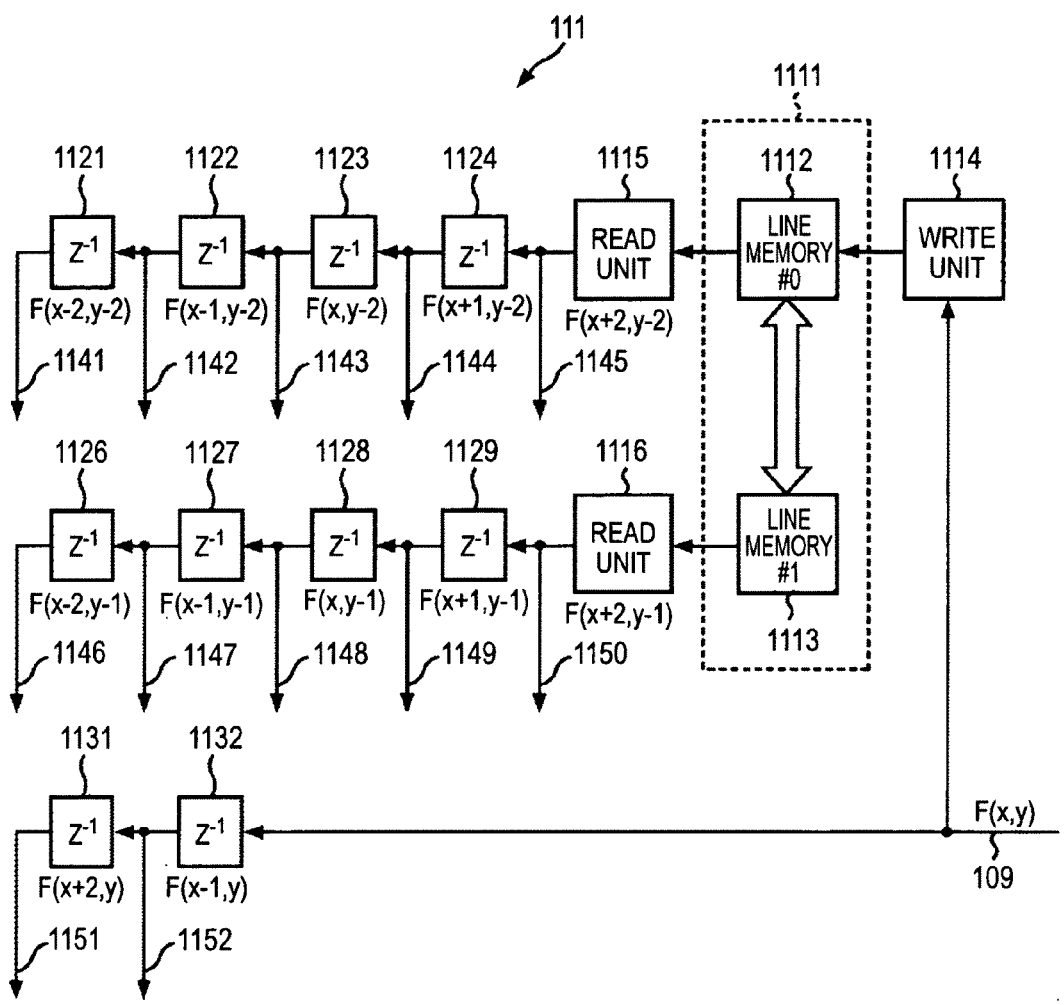
FIG. 7 is a block diagram illustrating an example of the structure of a corrected pixel value supply unit 111.

FIG. 7 is a diagram illustrating an example of the structure of the corrected pixel value supply unit 111 shown in FIG. 6.

The corrected pixel value supply unit 111 includes a memory 1111, a write unit 1114, read units 1115 and 1116, and delay elements 1121 to 1132.

The memory 1111 includes line memories #0 (1112) and #1 (1113). The line memory #0 (1112) stores the corrected signals F of a line (y−2) in a vertical direction Y. The line memory #1 (1113) stores the corrected signals F of a line (y−1) in the vertical direction Y.

The write unit 1114 writes the corrected signal F(x, y) to the memory 1111. The read unit 1115 reads the corrected signals F of the line (y−2) in the vertical direction Y one by one from the line memory #0 (1112). The corrected signal F(x+2, y−2), which is the output of the read unit 1115, is input to the delay element 1124 and is also supplied to one input of the comparator 1165 through a signal line 1145. In addition, the read unit 1116 reads the corrected signals F of the line (y−1) in the vertical direction Y one by one from the line memory #1 (1113). The corrected signal F(x+2, y−1), which is the output of the read unit 1116, is input to the delay element 1129 and is also supplied to one input of the comparator 1170 through a signal line 1150.

The delay elements 1121 to 1124 form a shift register that delays the output of the read unit 1115. That is, the corrected signal F(x+1, y−2), which is the output of the delay element 1124, is input to the delay element 1123 and is also supplied to one input of the comparator 1164 through a signal line 1144. The corrected signal F(x, y−2), which is the output of the delay element 1123, is input to the delay element 1122 and is also supplied to one input of the comparator 1163 through the signal line 1143. The corrected signal F(x−1, y−2), which is the output of the delay element 1122, is input to the delay element 1121 and is also supplied to one input of the comparator 1162 through a signal line 1142. The corrected signal F(x−2, y−2), which is the output of the delay element 1121, is supplied to one input of the comparator 1161 through a signal line 1141.

The delay elements 1126 to 1129 form a shift register that delays the output of the read unit 1116. That is, the corrected signal F(x+1, y−1), which is the output of the delay element 1129, is input to the delay element 1128 and is also supplied to one input of the comparator 1169 through a signal line 1149. The corrected signal F(x, y−1), which is the output of the delay element 1128, is input to the delay element 1127 and is also supplied to one input of the comparator 1168 through a signal line 1148. The corrected signal F(x−1, y−1), which is the output of the delay element 1127, is input to the delay element 1126 and is also supplied to one input of the comparator 1167 through a signal line 1147. The corrected signal F(x−2, y−1), which is the output of the delay element 1126, is supplied to one input of the comparator 1166 through a signal line 1146.

The delay elements 1131 and 1132 form a shift register that delays the corrected signal F(x, y). That is, the corrected signal F(x−1, y), which is the output of the delay element 1132, is input to the delay element 1131 and is also supplied to one input of the comparator 1172 through a signal line 1152. The corrected signal F(x−2, y), which is the output of the delay element 1131, is supplied to one input of the comparator 1171 through a signal line 1151.

The corrected signal F(x, y) of the signal line 109 is stored at an address x of the line memory #0 (1112). When a process corresponding to one line is completed in the raster scanning order, the line memory #0 (1112) is exchanged with the line memory #1 (1113) such that the corrected signal stored in the line memory #0 (1112) corresponds to the line (y−2) in the vertical direction Y and the corrected signal stored in the line memory #1 (1113) corresponds to the line (y−1) in the vertical direction Y.

[Example of Structure of Feedback Arithmetic Unit 240]

Figure 8:
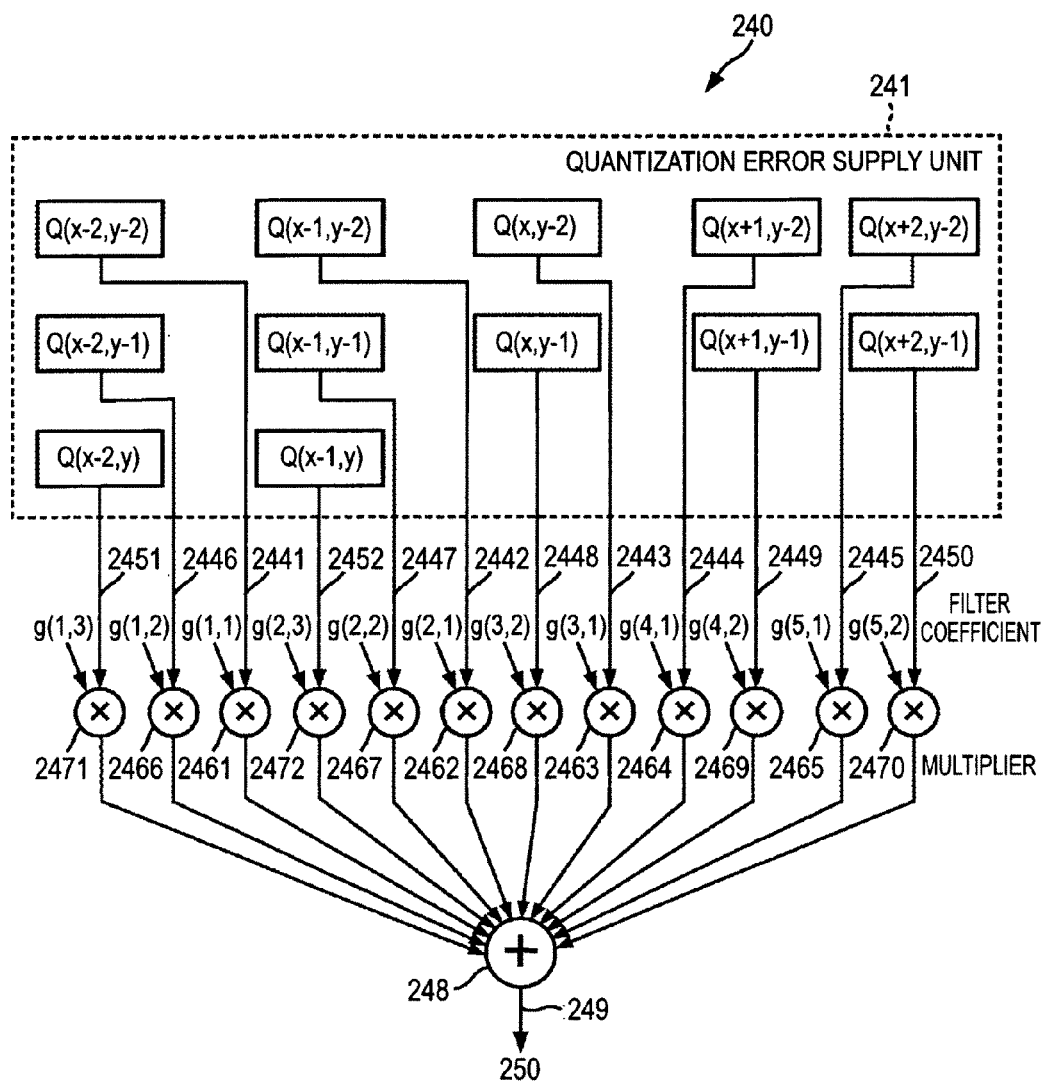
FIG. 8 is a block diagram illustrating an example of the structure of a feedback arithmetic unit 240.

FIG. 8 is a diagram illustrating an example of the structure of the feedback arithmetic unit 240 shown in FIG. 4.

The feedback arithmetic unit 240 includes a quantization error supply unit 241, multipliers 2461 to 2472, and an adder 248, and forms a FIR filter.

The quantization error supply unit 241 supplies the previous value of the quantization error Q(x, y). In this example, it is assumed that 12 quantization errors Q(x−2, y−2), Q(x−1, y−2), Q(x, y−2), Q(x+1, y−2), Q(x+2, y−2), Q(x−2, y−1), Q(x−1, y−1), Q(x, y−1), Q(x+1, y−1), Q(x+2, y−1), Q(x−2, y), and Q(x−1, y) are supplied.

Each of the multipliers 2461 to 2472 multiplies the quantization error Q supplied from the quantization error supply unit 241 by a filter coefficient g. In this example, it is assumed that 12 filter coefficients are used. The multiplier 2461 multiplies the quantization error Q(x−2, y−2) by a filter coefficient g(1, 1). The multiplier 2462 multiplies the quantization error Q(x−1, y−2) by a filter coefficient g(2, 1). The multiplier 2463 multiplies the quantization error Q(x, y−2) by a filter coefficient g(3, 1). The multiplier 2464 multiplies the quantization error Q(x+1, y−2) by a filter coefficient g(4, 1). The multiplier 2465 multiplies the quantization error Q(x+2, y−2) by a filter coefficient g(5, 1). The multiplier 2466 multiplies the quantization error Q(x−2, y−1) by a filter coefficient g(1, 2). The multiplier 2467 multiplies the quantization error Q(x−1, y−1) by a filter coefficient g(2, 2). The multiplier 2468 multiplies the quantization error Q(x, y−1) by a filter coefficient g(3, 2). The multiplier 2469 multiplies the quantization error Q(x+1, y−1) by a filter coefficient g(4, 2). The multiplier 2470 multiplies the quantization error Q(x+2, y−1) by a filter coefficient g(5, 2). The multiplier 2471 multiplies the quantization error Q(x−2, y) by a filter coefficient g(1, 3). The multiplier 2472 multiplies the quantization error Q(x−1, y) by a filter coefficient g(2, 3).

The adder 248 adds the outputs of the multipliers 2461 to 2472. The added result of the adder 248 is supplied as a feedback value to one input of the adder 250 through a signal line 249.

[Example of Structure of Quantization Error Supply Unit 241]

Figure 9:
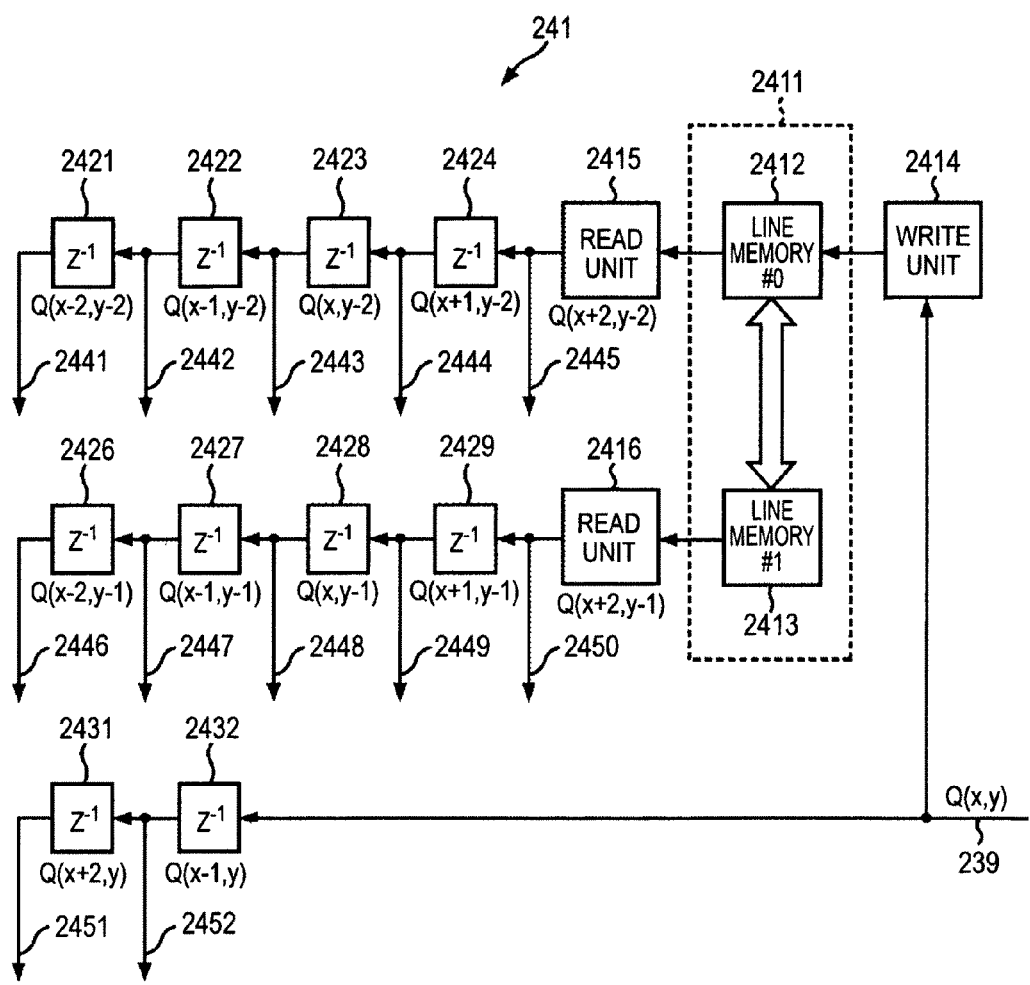
FIG. 9 is a block diagram illustrating an example of the structure of a quantization error supply unit 241.

FIG. 9 is a diagram illustrating an example of the structure of the quantization error supply unit 241 shown in FIG. 8.

The quantization error supply unit 241 includes a memory 2411, a write unit 2414, read units 2415 and 2416, and delay elements 2421 to 2432.

The memory 2411 includes line memories #0 (2412) and #1 (2413). The line memory #0 (2412) stores the quantization errors Q of the line (y−2) in the vertical direction Y. The line memory #1 (2413) stores the quantization errors Q of the line (y−1) in the vertical direction Y.

The write unit 2414 writes the quantization error Q(x, y) to the memory 2411. The read unit 2415 reads the quantization errors Q of the line (y−2) in the vertical direction Y one by one from the line memory #0 (2412). The quantization error Q(x+2, y−2), which is the output of the read unit 2415, is input to the delay element 2424 and is also supplied to one input of the multiplier 2465 through a signal line 2445. In addition, the read unit 2416 reads the quantization errors Q of the line (y−1) in the vertical direction Y one by one from the line memory #1 (2413). The quantization error Q(x+2, y−1), which is the output of the read unit 2416, is input to the delay element 2429 and is also supplied to one input of the multiplier 2470 through a signal line 2450.

The delay elements 2421 to 2424 form a shift register that delays the output of the read unit 2415. That is, the quantization error Q(x−1, y−2), which is the output of the delay element 2424, is input to the delay element 2423 and is also supplied to one input of the multiplier 2464 through a signal line 2444. The quantization error Q(x, y−2), which is the output of the delay element 2423, is input to the delay element 2422 and is also supplied to one input of the multiplier 2463 through a signal line 2443. The quantization error Q(x−1, y−2), which is the output of the delay element 2422, is input to the delay element 2421 and is also supplied to one input of the multiplier 2462 through a signal line 2442. The quantization error Q(x−2, y−2), which is the output of the delay element 2421, is supplied to one input of the multiplier 2461 through a signal line 2441.

The delay elements 2426 to 2429 form a shift register that delays the output of the read unit 2416. That is, the quantization error Q(x+1, y−1), which is the output of the delay element 2429, is input to the delay element 2428 and is also supplied to one input of the multiplier 2469 through a signal line 2449. The quantization error Q(x, y−1), which is the output of the delay element 2428, is input to the delay element 2427 and is also supplied to one input of the multiplier 2468 through a signal line 2448. The quantization error Q(x−1, y−1), which is the output of the delay element 2427, is input to the delay element 2426 and is also supplied to one input of the multiplier 2467 through a signal line 2447. The quantization error Q(x−2, y−1), which is the output of the delay element 2426, is supplied to one input of the multiplier 2466 through a signal line 2446.

The delay elements 2431 and 2432 form a shift register that delays the quantization error Q(x, y). That is, the quantization error Q(x−1, y), which is the output of the delay element 2432, is input to the delay element 2431 and is also supplied to one input of the multiplier 2472 through a signal line 2452. The quantization error Q(x−2, y), which is the output of the delay element 2431, is supplied to one input of the comparator 2471 through the signal line 2451.

The quantization error Q(x, y) of the signal line 239 is stored at an address x of the line memory #0 (2412). When a process corresponding to one line is completed in the raster scanning order, the line memory #0 (2412) is exchanged with the line memory #1 (2413) such that the quantization error stored in the line memory #0 (2412) corresponds to the line (y−2) in the vertical direction Y and the quantization error stored in the line memory #1 (2413) corresponds to the line (y−1) in the vertical direction Y.

[Characteristics of Noise Shaping by Grayscale Modulator 200 and Filter Coefficient of Filtering by Feedback Arithmetic Unit 240]

Figure 10:
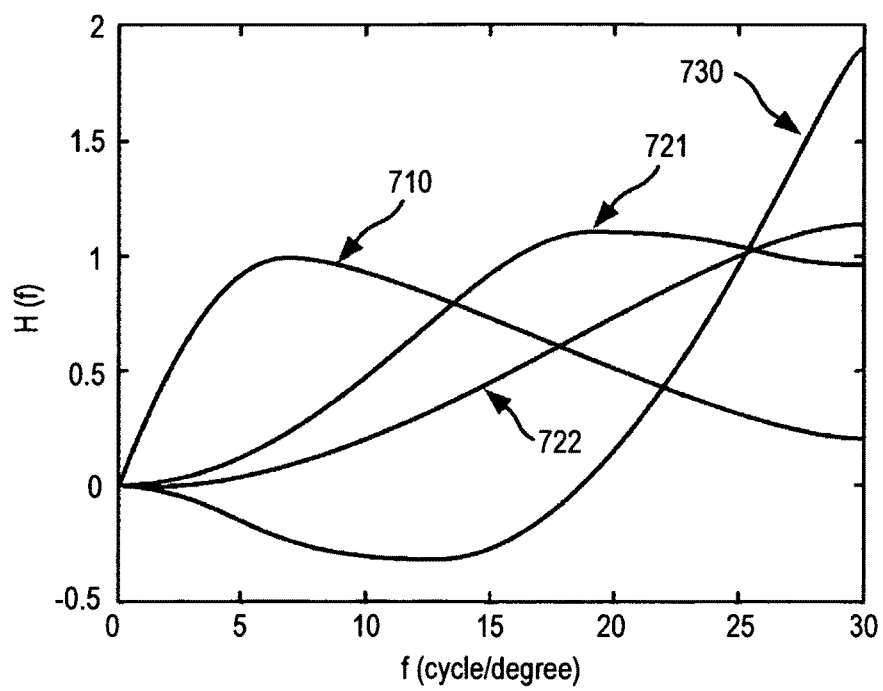
FIG. 10 is a diagram illustrating the visual characteristics of the human and the amplitude characteristics of a filter when the maximum frequency of a spatial frequency is 30 cpd.

FIG. 10 is a diagram illustrating the visual characteristics of the human and the amplitude characteristics of noise shaping by the $\Delta\Sigma$ modulation of the grayscale modulator 200 shown in FIG. 4 when the maximum value of the spatial frequency of the image that can be displayed by a display device for displaying an image after grayscale conversion is 30 cpd.

The horizontal axis indicates a spatial frequency f [cpd]. For human visual characteristics 710, the vertical axis indicates contrast sensitivity. For the amplitude characteristics 721, 722, and 730 of noise shaping, the vertical axis indicates a gain.

Figure 3:
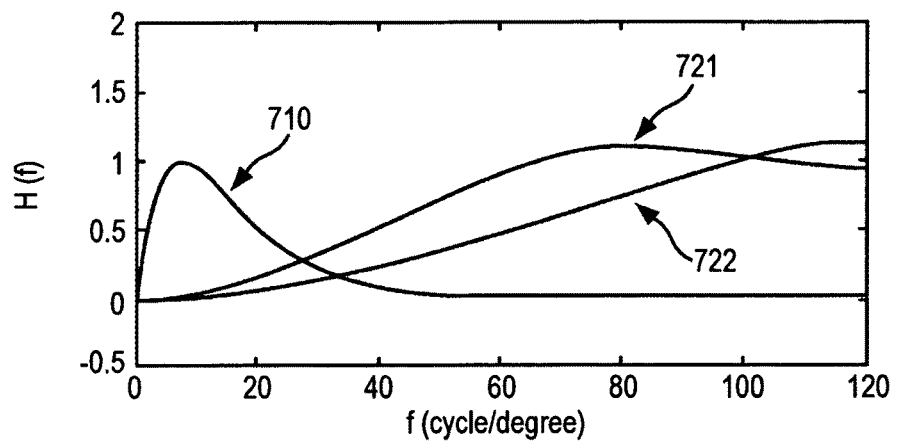
FIG. 3 is a diagram illustrating the visual characteristics of the human and the amplitude characteristics of noise shaping by a filter according to the related art.
Figure 3:
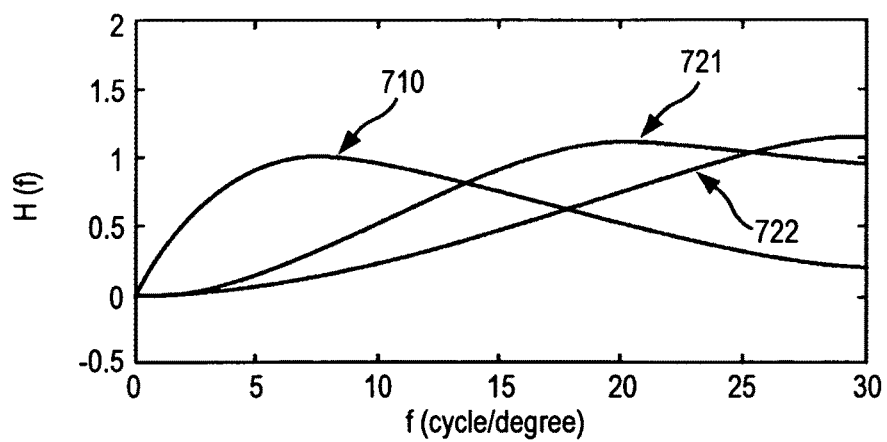

The amplitude characteristics 721 and 722 indicate the amplitude characteristics of noise shaping by a Jarvis filter and the amplitude characteristics of noise shaping by a Floyd filter, respectively, similar to FIG. 3. The amplitude characteristics 730 indicate the amplitude characteristics of noise shaping by the feedback arithmetic unit 240, which is a two-dimensional filter.

In FIG. 10, the human visual characteristics 710 have a peak value around a spatial frequency f of 7 cpd, and are attenuated to around 60 cpd. In contrast, the amplitude characteristics 730 of noise shaping by the grayscale modulator 200 shown in FIG. 4 are a curve in which the spatial frequency f is attenuated to around 12 cpd in the negative direction and then rise sharply. That is, the grayscale modulator has the amplitude characteristics 730 in which the quantization error of a low frequency component having a frequency that is about two-thirds of the maximum frequency of the spatial frequency of the image that can be displayed by the display is attenuated and the quantization error is modulated to a frequency band in which sensitivity to the human visual characteristics 710 is sufficiently low.

In the Jarvis filter and the Floyd filter according to the related art, the amplitude characteristics 721 and 722 show that it is difficult to modulate the quantization error to the frequency band in which sensitivity to the human visual characteristics 710 is sufficiently low.

The filter coefficient of filtering by the feedback arithmetic unit 240 of the grayscale modulator 200 shown in FIG. 4 is determined such that the amplitude characteristics of noise shaping by the ΔΣ modulation of the grayscale modulator 200 are the amplitude characteristics 730 shown in FIG. 10.

That is, the image whose grayscale is converted by the image processing apparatus shown in FIG. 4 is displayed by the display device (not shown). Therefore, in order to improve the quality of the image displayed by the display device, it is preferable to consider the maximum spatial frequency of the image displayed by the display device for the spatial frequency characteristics (visual characteristics) of the human eye.

The filter coefficient of filtering by the feedback arithmetic unit 240 is determined on the basis of the characteristics of equal to or lower than a spatial frequency corresponding to the resolution of the display device, among the spatial frequency characteristics (visual characteristics) of the human eye.

Specifically, the maximum spatial frequency of the image displayed by the display device may be obtained as the spatial frequency whose unit is cpd from the resolution of the display device and a distance (hereinafter, referred to as a viewing distance) from a viewer to the display device when the viewer views the display devices.

When the length of the display device in the vertical direction (longitudinal) is H inches, the viewing distance is, for example, in the range of about 2.5H to about 3.0H.

For example, when the display device has a 40-inch size of 1920×1080 pixels capable of displaying a so-called HD (high definition) image, the maximum spatial frequency of the image displayed by the display device is 30 cpd.

The maximum spatial frequency of the image displayed by the display device is determined by the resolution of the display device. Therefore, hereinafter, the maximum spatial frequency of the image displayed by the display device is appropriately referred to as a spatial frequency corresponding to the resolution.

FIG. 10 shows the visual characteristics 710 that are equal to or lower than a spatial frequency corresponding to the resolution of the display device.

That is, for example, FIG. 10 shows the visual characteristics 730 that are equal to or lower than a spatial frequency of 30 cpd with the premise that the spatial frequency corresponding to the resolution of the display device is equal to or lower than 30 cpd, for example.

The filter coefficient of filtering by the feedback arithmetic unit 240 is determined on the basis of the visual characteristics 710 shown in FIG. 10 such that the characteristics of noise shaping by the grayscale modulator 200 in a frequency band that is equal to or more than an intermediate frequency band are the inverse characteristics of the visual characteristics 710 shown in FIG. 10, in a frequency band that is equal to or lower than a spatial frequency corresponding to the resolution of the display device.

The amplitude characteristics 730 shown in FIG. 10 indicate the amplitude characteristics of noise shaping with the filter coefficient that has been determined in this way.

In the amplitude characteristics 730 shown in FIG. 10, that is, the amplitude characteristics 730 of noise shaping by the grayscale modulator 200, the gain is the maximum at a spatial frequency of 30 cpd corresponding to the resolution of the display device, and in the frequency band (from 0 cpd) to a spatial frequency corresponding to the resolution of the display device, the characteristics in a frequency band that is equal to or more than the intermediate frequency band are the inverse characteristics of the visual characteristics 710 shown in FIG. 10 (hereinafter, appropriately referred to as inverse characteristics), that is, the characteristics of an HPF (high pass filter).

The amplitude characteristics 730 of noise shaping by the grayscale modulator 200 increase in a high frequency band more rapidly than the amplitude characteristics 722 of noise shaping by the Floyd filter.

Therefore, according to noise shaping with the amplitude characteristics 730 shown in FIG. 10, among the quantization errors included in the pixel values (output signals) OUT(x, y) of the image after grayscale conversion, the number of frequency components in a high frequency band in which sensitivity to the human eye is low is increased, and the number of intermediate frequency components including around a spatial frequency of 7 cpd where sensitivity to the human eye is high is reduced.

As a result, it is possible to prevent the quantization error from occurring as noise in an image after grayscale conversion and thus improve the visual quality of an image.

The amplitude characteristics of noise shaping in a frequency band that is equal to or more than an intermediate frequency band are not necessarily completely identical to the inverse characteristics of the human eye. That is, the amplitude characteristics of noise shaping in the frequency band that is equal to or more than the intermediate frequency band may be similar to the inverse characteristics of the human eye.

The entire amplitude characteristics of noise shaping may be the inverse characteristics of the visual characteristics 710.

That is, according to the visual characteristics 710 shown in FIG. 10, the sensitivity of the human eye to a low frequency component in addition to a high frequency band is low. As the amplitude characteristics of noise shaping, the characteristics of a so-called bandpass filter that transmits high and low frequency components may be used.

However, when the characteristics of the bandpass filter are used as the amplitude characteristics of noise shaping, the number of taps of the amplitude characteristics of noise shaping increases, which results in an increase in the size of an apparatus and an increase in manufacturing costs.

Therefore, in order to reduce the size of the apparatus and the manufacturing costs, it is preferable that the amplitude characteristics of noise shaping in a frequency band that is equal to or less than the intermediate frequency band shown in FIG. 10 be the characteristics of the HPF, which is opposite to the visual characteristics of the human.

In FIG. 10, the amplitude characteristics 730 of noise shaping by the grayscale modulator 200 have a gain that is significantly more than 1 in the high frequency band, which shows that the quantization error in the high frequency band is amplified more than when the Jarvis filter or the Floyd filter is used.

In FIG. 10, the amplitude characteristics 730 of noise shaping by the grayscale modulator 200 have a negative gain in the range of a low frequency band to an intermediate frequency band. Therefore, the feedback arithmetic unit 240 may be composed of a two-dimensional filter with a small number of taps.

That is, for example, in order to obtain the amplitude characteristics 730 of noise shaping by the grayscale modulator 200 in which the gain is 0 in the low and intermediate frequency bands and sharply increase in the high frequency band, the feedback arithmetic unit 240 needs to be composed of a two-dimensional filter with a large number of taps.

In contrast, when the amplitude characteristics 730 of noise shaping by the grayscale modulator 200 have a negative gain in the low or intermediate frequency band, it is possible to rapidly increase the gain in the high frequency band using a two-dimensional filter with a small number of taps, that is, for example, the two-dimensional filter with 12 taps shown in FIG. 8 (a filter with 12 filter coefficients g(1, 1), g(2, 1), g(3, 1), g(4, 1), g(5, 1), g(1, 2), g(2, 2), g(3, 2), g(4, 2), g(5, 2), g(1, 3), and g(2, 3)), as compared to when the Floyd filter is used.

Therefore, it is possible to reduce the size of the grayscale modulator 200.

[Description of Image after Grayscale Conversion]

Figure 11:
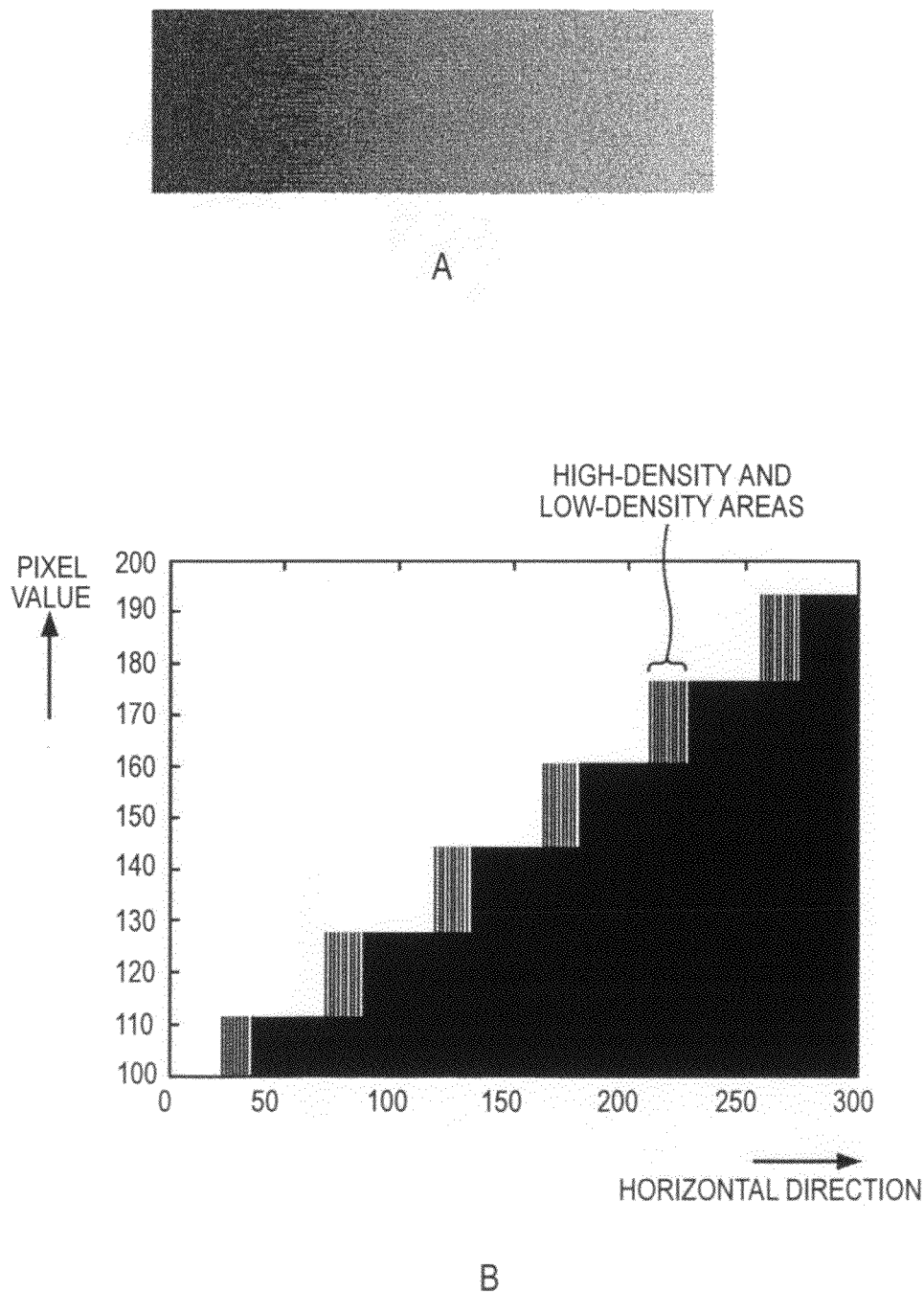
FIG. 11 is a diagram illustrating an example of the result of grayscale conversion.

FIG. 11 is a diagram illustrating an example of the image whose grayscale is converted by the image processing apparatus shown in FIG. 4.

Figure 1:
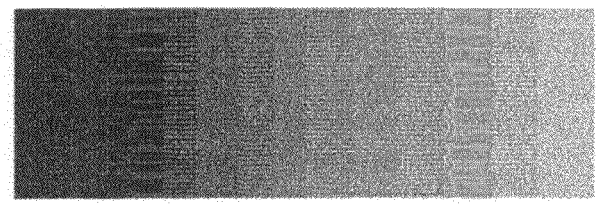
FIG. 1 is a diagram illustrating an example of an 8-bit grayscale image.
Figure 1:
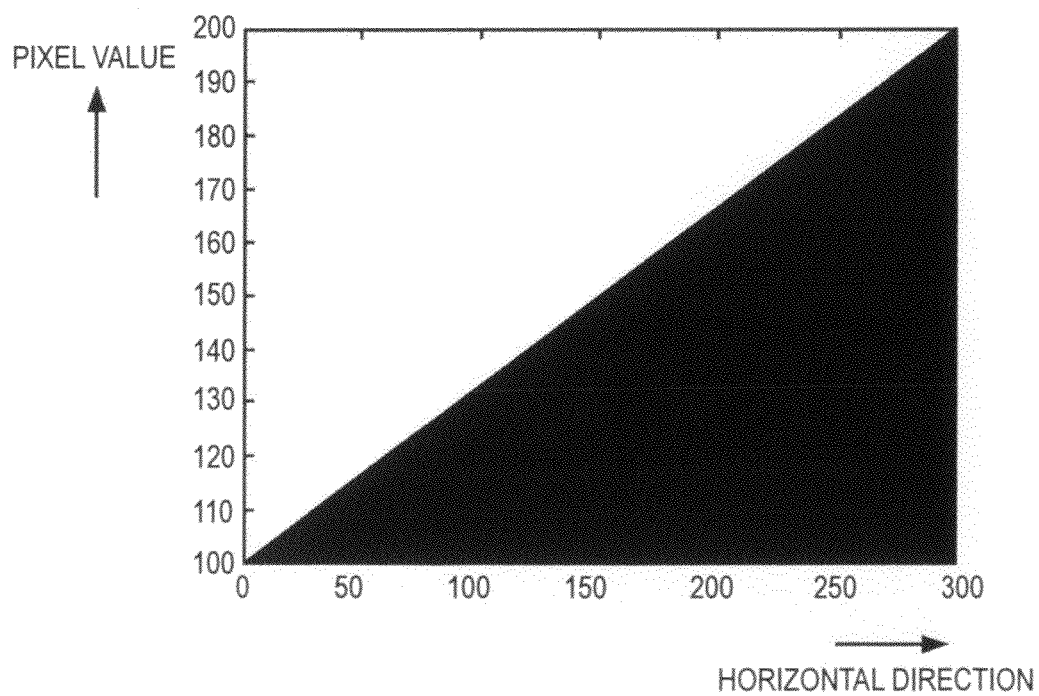

A of FIG. 11 shows an example of a 4-bit grayscale-converted image that is converted from an 8-bit grayscale image shown in A of FIG. 1 by the image processing apparatus shown in FIG. 4. As can be seen from this example, it is possible to represent a grayscale level that is visually equal to that shown in A of FIG. 1 with 16 grayscale levels (4 bits).

Figure 2:
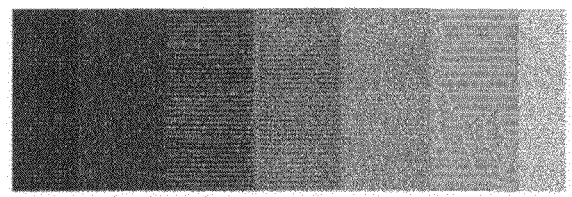
FIG. 2 is a diagram illustrating an example when an 8-bit grayscale image is merely quantized into a 4-bit grayscale image.
Figure 2:
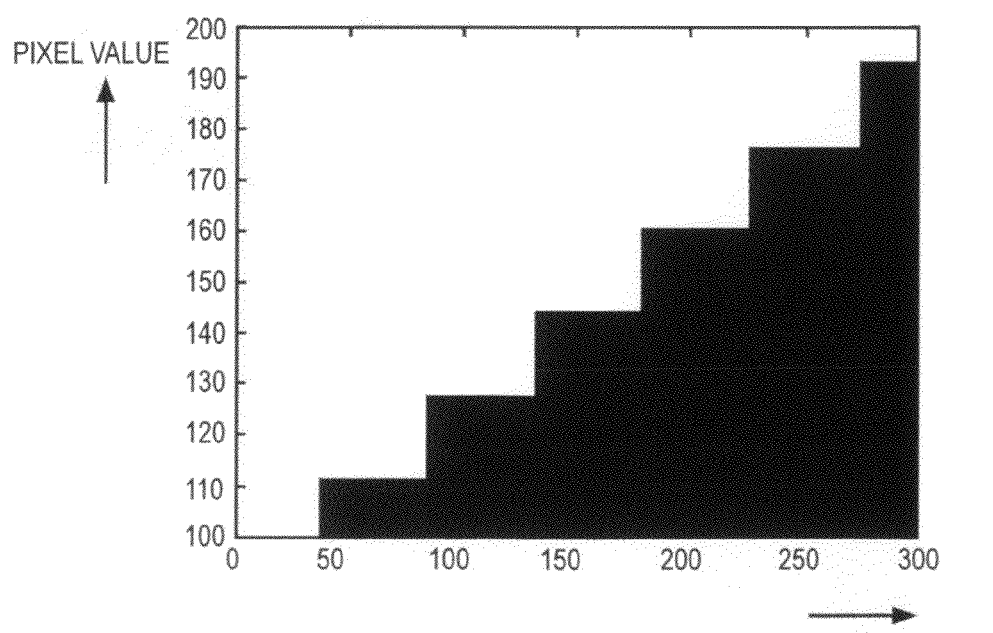

B of FIG. 11 is a graph illustrating the pixel values shown in A of FIG. 11. In the graph, the horizontal axis indicates the coordinates in the horizontal direction and the vertical axis indicates the pixel vale at each coordinate. In this example, because of 4-bit quantization, the graph has a stepwise shape close to the shape of the graph shown in B of FIG. 2, and a portion in which the pixel value is changed is represented by the density of dots.

That is, 8 bits can represent 256 grayscale levels, but 4 bits can represent only 16 grayscale levels. However, in a 4-bit image after grayscale conversion, there are high-density and low-density areas in which the density of pixels with a pixel value equal to a quantized value Q and the density of pixels with a pixel value equal to a quantized value Q+1 (or a quantized value Q−1 smaller than the quantized value Q by 1) larger than the quantized value Q by 1 are high and low, that is, an area in which the percentage of pixels with a pixel value equal to the quantized value Q is high or an area in which the percentage of pixels with a pixel value equal to the quantized value Q+1 is high (an area in which the percentage of pixels with a pixel value equal to the quantized value Q is low or an area in which the percentage of pixels with a pixel value equal to the quantized value Q+1 is low). The pixel values of the high-density and low-density areas seem to be smoothly changed by the integrating effect of the human eye.

As a result, although 4 bits represent only 16 grayscale levels, it is possible to represent pseudo 256 grayscale levels as in the 8-bit image before grayscale conversion, in the 4-bit image after grayscale conversion.

[Operation of Image Processing Apparatus]

Next, the operation of the image processing apparatus shown in FIG. 4 will be described with reference to the drawings.

Figure 12:
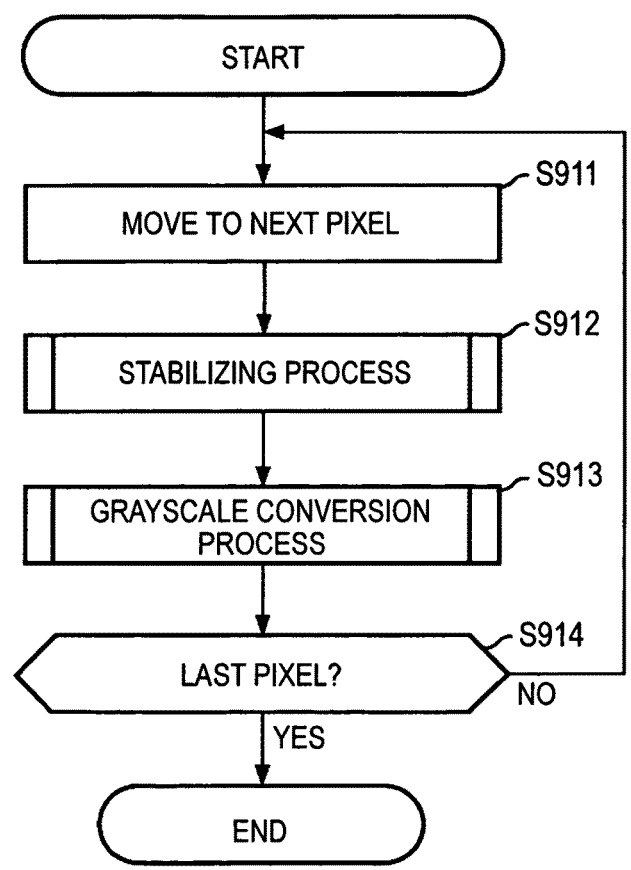
FIG. 12 is a flowchart illustrating an example of the process sequence of the image processing apparatus.

FIG. 12 is a flowchart illustrating the operation (image processing method) of the image processing apparatus shown in FIG. 4.

In the embodiment of the invention, as described with reference to FIG. 5, each pixel is processed in the direction from the left side to the right side and from the upper side to the lower side of the image signal (Step S911).

That is, in Step S911, the image processing apparatus supplies one pixel, which is not yet an interesting pixel, among the pixels supplied in the raster scanning order as an interesting pixel to the stabilizer 100 in the raster scanning order, and the process proceeds to Step S912.

The entire process of the image processing apparatus is mainly divided into a stabilizing process performed by the stabilizer 100 (Step S912) and a grayscale modulating process performed by the grayscale modulator 200 (Step S913). These processes are performed for each pixel. When the last pixel of the image signal is completely processed, the processes for the image signal end (Step S914).

That is, in Step S912, the stabilizer 100 performs the stabilizing process on the interesting pixel (the pixel value of the interesting pixel), and the interesting pixel subjected to the stabilizing process is supplied to the grayscale modulator 200. Then, the process proceeds to Step S913.

In Step S913, the grayscale modulator 200 performs ΔΣ modulation on the interesting pixel from the stabilizer 100 to calculate the pixel value of the interesting pixel after grayscale conversion and outputs the calculated pixel value. Then, the process proceeds to Step S914.

In Step S914, the image processing apparatus shown in FIG. 4 determines whether the interesting pixel is the last pixel supplied to the stabilizer 100. In Step S914, if it is determined that the interesting pixel is not the last pixel, the process returns to Step S911. Among the pixels supplied to the stabilizer 100, the pixels that are not yet interesting pixels are newly set as interesting pixels in the raster scan order, and the same process as described above is repeatedly performed.

If it is determined in Step S914 that the interesting pixel is the last pixel, the image processing of the image processing apparatus shown in FIG. 4 ends.

[Description of Stabilizing Process]

Figure 13:
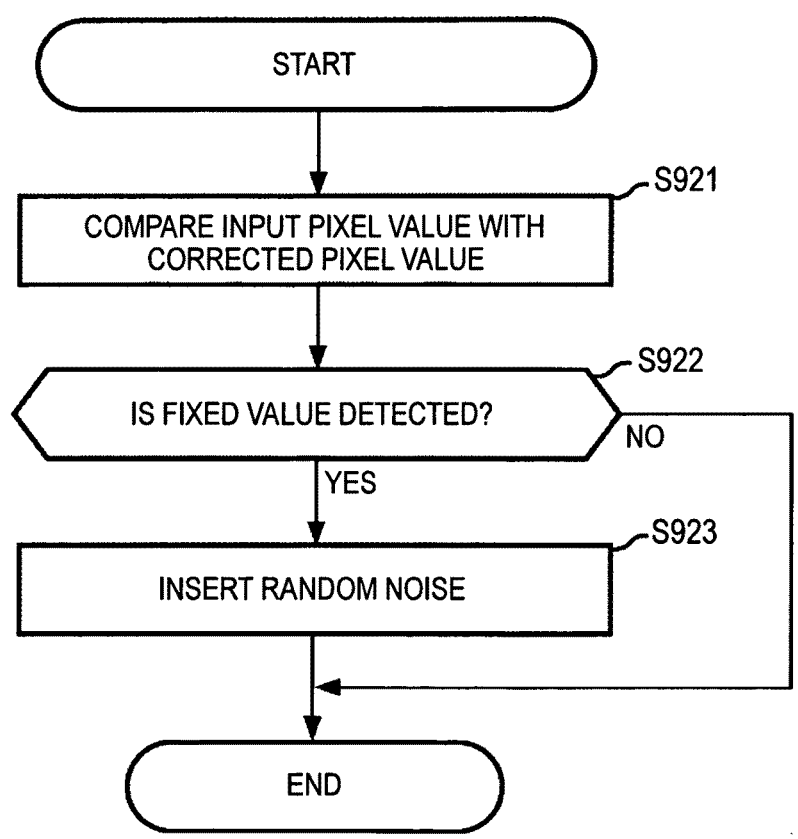
FIG. 13 is a flowchart illustrating an example of the procedure of a stabilizing process.

FIG. 13 is a flowchart illustrating the stabilizing process (Step S912) shown in FIG. 12.

As described with reference to FIG. 6, the fixed value detecting unit 110 compares the pixel value of the previous corrected signal F with the pixel value of the input signal IN(x, y) (Step S921). As a result, if it is detected that the same data is continuously input as a fixed value (Step S922), the random noise generated by the random noise generating unit 120 is added to the input signal IN(x, y) through the switch 130 (Step S923). In this way, the hunting phenomenon of the grayscale modulator 200 is prevented.

That is, in the stabilizing process, in Step S921, the fixed value detecting unit 110 (FIG. 4) compares the pixel value (input signal IN(x, y)) of an interesting pixel with the pixel value (corrected signal F (x, y)), which is output from the adder 140, of a pixel (hereinafter, referred to as a processed peripheral pixel) which has already been an interesting pixel, among the pixels around the interesting pixel. Then, the process proceeds to Step S922.

In Step S922, the fixed value detecting unit 110 determines whether the identity between the pixel value of the interesting pixel and the pixel value of the processed peripheral pixel is detected, on the basis of the comparison result of the pixel values in Step S921.

If it is determined in Step S922 that the identity between the pixel value of the interesting pixel and the pixel value of the processed peripheral pixel is detected, that is, for example, all of 12 corrected signals F(x−2, y−2), F(x−1, y−2), F(x, y−2), F(x+1, y−2), F(x+2, y−2), F(x−2, y−1), F(x−1, y−1), F(x, y−1), F(x+1, y−1), F(x+2, y−1), F(x−2, y), and F(x−1, y) shown in FIG. 6, which are the pixel values of the processed peripheral pixels, are identical to the input signals IN(x, y), which are the pixel values of the interesting pixels, the process proceeds to Step S923. The fixed value detecting unit 110 turns on the switch 130, and the process returns.

In this case, the random noise generated by the random noise generating unit 120 is supplied to the adder 140 through the switch 130. The adder 140 adds the random noise supplied through the switch 130 to the pixel value (IN(x, y)) of the interesting pixel, and the added value is output as the pixel value (corrected signal F(x, y)) of the interesting pixel to the fixed value detecting unit 110 and the adder 250.

On the other hand, if it is determined in Step S922 that the identity between the pixel value of the interesting pixel and the pixel value of the processed peripheral pixel is not detected, the fixed value detecting unit 110 turns off the switch 130. The process skips Step S923 and returns.

In this case, the random noise generated by the random noise generating unit 120 is not supplied to the adder 140. Therefore, the adder 140 outputs the pixel value (IN(x, y)) of the interesting pixel to the fixed value detecting unit 110 and the adder 250 without any change.

[Description of Grayscale Modulating Process]

Figure 14:
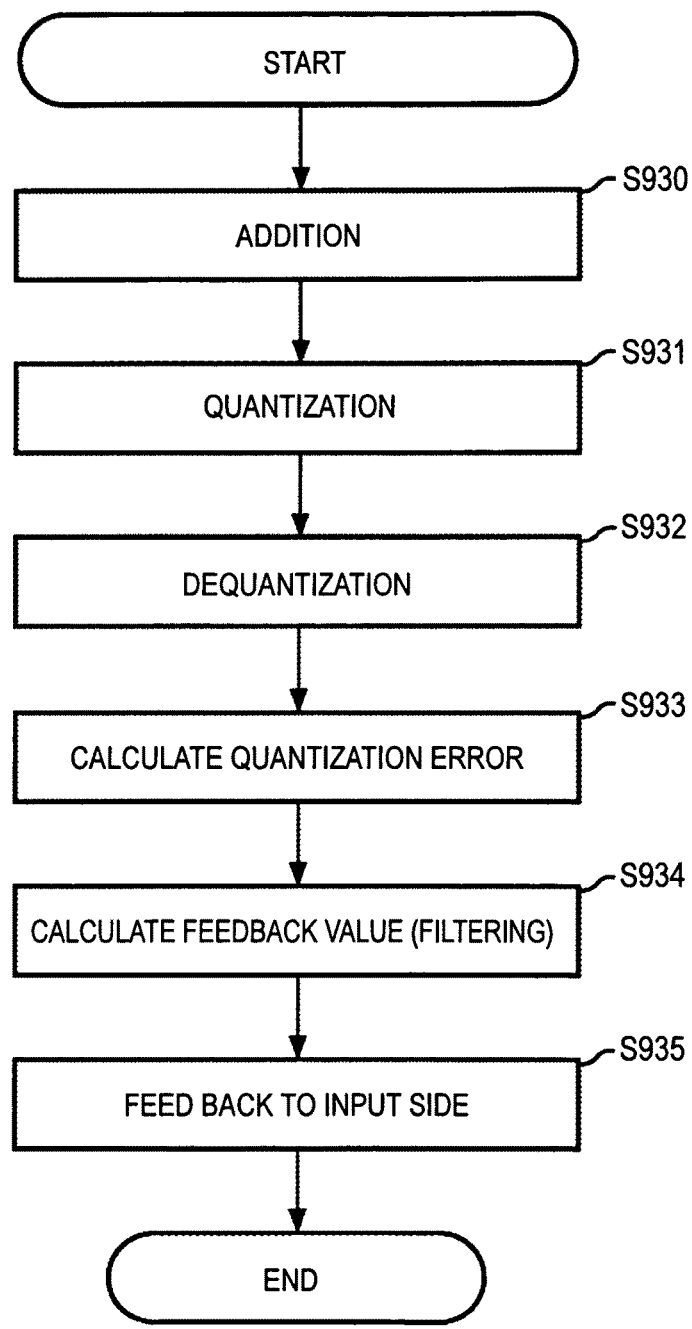
FIG. 14 is a flowchart illustrating an example of the procedure of a grayscale modulating process.

FIG. 14 is a flowchart illustrating the grayscale modulating process (Step S913) shown in FIG. 12.

The adder 250 adds the pixel value of the interesting pixel supplied from (the adder 140 of) the stabilizer 100 and the output of the feedback arithmetic unit 240, and outputs the added value to the quantizer 210 and the subtractor 230 (Step S930).

The quantizer 210 quantizes the output of the adder 250 (Step S931), and outputs the quantized value as an output signal OUT(x, y). The quantized output signal OUT(x, y) is dequantized by the dequantizer 220 (Step S932).

The subtractor 230 calculates the difference between the signal before quantization by the quantizer 210 and the signal dequantized by the dequantizer 220, thereby calculating the quantization error Q(x, y) (Step S933).

The quantization error Q(x, y) calculated in this way is accumulated. As described with reference to FIG. 8, the feedback arithmetic unit 240 uses the quantization error Q(x, y) to calculate a feedback value (Step S934). The feedback value calculated in this way is fed back to the adder 250 (Step S935).

That is, in Step S930, the adder 250 adds the pixel value of the interesting pixel supplied from (the adder 140 of) the stabilizer 100 and a value (the output of the feedback arithmetic unit 240) obtained by a filtering operation of the feedback arithmetic unit 240 in Step S934, which will be described below, and outputs the added value to the quantizer 210 and the subtractor 230. Then, the process proceeds to Step S931.

In Step S931, the quantizer 210 quantizes the added value output from the adder 250 and outputs the quantized value including the quantization error as the result of $\Delta\Sigma$ modulation (the result of grayscale conversion by $\Delta\Sigma$ modulation). Then, the process proceeds to Step S932.

In Step S932, the dequantizer 220 dequantizes the quantized value output from the quantizer 210 and outputs the dequantized value to the subtractor 230. Then, the process proceeds to Step S933.

In Step S933, the subtractor 230 calculates the difference between the added value output from the adder 250 and the output of the dequantizer 220, that is, the quantization result of the quantized value of the added value output from the adder 250, thereby calculating the quantization error during the quantization of the quantizer 210. In addition, the subtractor 230 supplies the quantization error to the feedback arithmetic unit 240, and the process proceeds from Step S933 to Step S934.

In Step S934, the feedback arithmetic unit 240, which is a two-dimensional filter, filters the quantization error from the subtractor 230. Then, the process proceeds to Step S935.

In Step S935, the feedback arithmetic unit 240 outputs (feeds back) the filtering result of the quantization error obtained in Step S934 to the adder 250. Then, the process returns.

As described above, in the image processing apparatus shown in FIG. 4, the filter coefficient of filtering by the feedback arithmetic unit 240 is determined such that the amplitude characteristics of noise shaping by $\Delta\Sigma$ modulation in a frequency band that is equal to or more than an intermediate frequency band are the inverse characteristics, such as the amplitude characteristics 730 shown in FIG. 10, of the visual characteristics 710 of the human. Therefore, it is difficult for the viewer to view the quantization error, which is noise, and it is possible to improve the visual quality of an image after grayscale conversion.

The image processing apparatus shown in FIG. 4 is provided with the stabilizer 100 that applies random noise to an image. Therefore, it is possible to prevent the hunting phenomenon of the grayscale modulator 200.

In this way, for example, a display device, such as a television set, can display an image having a pixel value with bits more than the bit width of the pixel value that can be displayed by a liquid crystal panel of the display device with an image quality corresponding to the bits.

That is, for example, even when the bit width of the pixel value that can be displayed by the liquid crystal panel is 8 bits, it is possible to obtain an image quality corresponding to 12 bits. Even when an input signal to the display device is 8 bits, a bit length that is equal to or more than 8 bits is obtained by various kinds of image processing. For example, an 8-bit image is expanded to a 12-bit image by noise reduction. When the bit width of each pixel value of the liquid crystal panel is 8 bits, it is necessary to quantize 12-bit data into 8-bit data. In this case, the image processing apparatus shown in FIG. 4 may perform grayscale conversion to obtain an image quality corresponding to 12 bits using an 8-bit liquid crystal panel. The grayscale conversion performed by the image processing apparatus shown in FIG. 4 may be similarly applied to a transmission path. For example, when a transmission path from a video apparatus to a display device has an 8-bit width, the image processing apparatus shown in FIG. 4 converts a 12-bit image signal of the video apparatus into an 8-bit signal and transmits the 8-bit signal to the display device. Then, the display device can display an image with an image quality corresponding to 12 bits.

[Characteristics of Noise Shaping and Example of Filter Coefficient]

Figure 15:
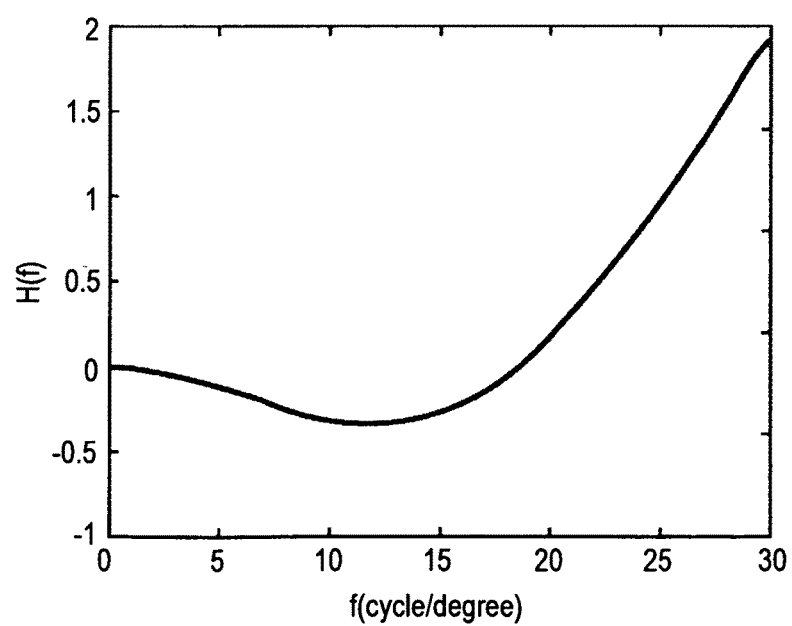
FIG. 15 is a diagram illustrating a first example of the amplitude characteristics of noise shaping and a filter coefficient.

FIG. 15 shows a first example of a filter coefficient and the amplitude characteristics of noise shaping by the $\Delta\Sigma$ modulation of the grayscale modulator 200 shown in FIG. 4 when the maximum frequency of the spatial frequency of the image that can be displayed by the display device for displaying a grayscale-converted image is 30 cpd.

That is, A of FIG. 15 shows a first example of the filter coefficient of a two-dimensional filter (feedback arithmetic unit 240) with 12 taps, which is determined such that the amplitude characteristics of noise shaping by the $\Delta\Sigma$ modulation of the grayscale modulator 200 are negative in a low or intermediate frequency band and rapidly increase in a high frequency band, as compared to the amplitude characteristics of noise shaping by the $\Delta\Sigma$ modulation of the Floyd filter.

In A of FIG. 15, as the filter coefficient of the two-dimensional filter with 12 taps, the following are used: $g(1, 1)=-0.0317$, $g(2, 1)=-0.1267$, $g(3, 1)=-0.1900$, $g(4, 1)=-0.1267$, $g(5, 1)=-0.0317$, $g(1, 2)=-0.1267$, $g(2, 2)$ 0.2406, $g(3, 2)=0.7345$, $g(4, 2)=0.2406$, $g(5, 2)=-0.1267$, $g(1, 3)=-0.1900$, and $g(2, 3)=0.7345$.

B of FIG. 15 shows the amplitude characteristics of noise shaping by the $\Delta\Sigma$ modulation of the grayscale modulator 200 when the filter coefficient of the two-dimensional filter is as shown in A of FIG. 15.

In the amplitude characteristics of noise shaping shown in B of FIG. 15, the gain is 0 at a frequency f=0, and the gain is negative in the low or intermediate frequency band. In addition, the gain rapidly increases in the high frequency band, as compared to the amplitude characteristics of noise shaping by the $\Delta\Sigma$ modulation of the Floyd filter.

Figure 16:
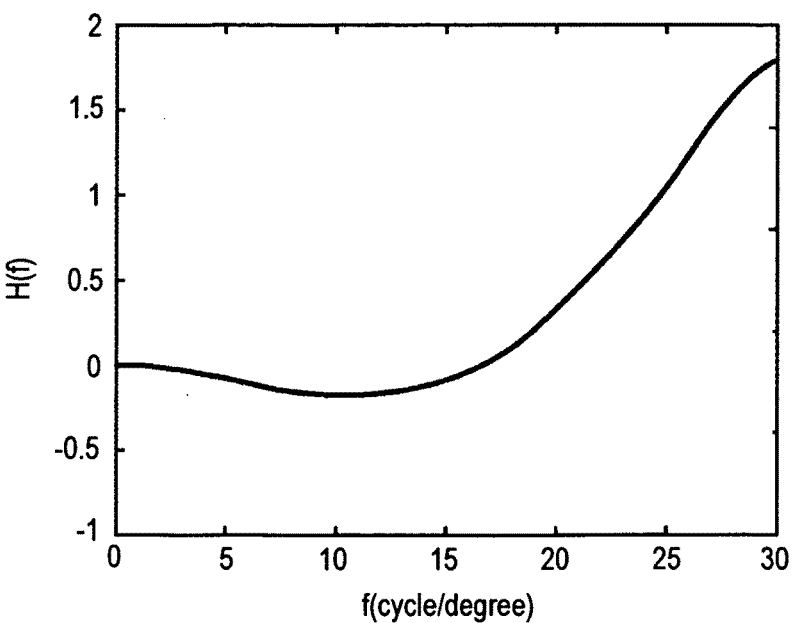
FIG. 16 is a diagram illustrating a second example of the amplitude characteristics of noise shaping and a filter coefficient.

FIG. 16 shows a second example of the filter coefficient and the amplitude characteristics of noise shaping by the $\Delta\Sigma$ modulation of the grayscale modulator 200 shown in FIG. 4 when the maximum frequency of the spatial frequency of the image that can be displayed by the display device for displaying a grayscale-converted image is 30 cpd.

That is, A of FIG. 16 shows a second example of the filter coefficient of a two-dimensional filter (feedback arithmetic unit 240) with 12 taps, which is determined such that the amplitude characteristics of noise shaping by the $\Delta\Sigma$ modulation of the grayscale modulator 200 are negative in a low or intermediate frequency band and rapidly increase in a high frequency band, as compared to the amplitude characteristics of noise shaping by the $\Delta\Sigma$ modulation of the Floyd filter.

In A of FIG. 16, as the filter coefficient of the two-dimensional filter with 12 taps, the following are used: $g(1, 1)=-0.0249$, $g(2, 1)=-0.0996$, $g(3, 1)=-0.1494$, $g(4, 1)=-0.0996$, $g(5, 1)=-0.0249$, $g(1, 2)=-0.0996$, $g(2, 2)=0.2248$, $g(3, 2)=0.6487$, $g(4, 2)=0.2248$, $g(5, 2)=-0.0996$, $g(1, 3)=-0.1494$, and $g(2, 3)=0.6487$.

B of FIG. 16 shows the amplitude characteristics of noise shaping by the $\Delta\Sigma$ modulation of the grayscale modulator 200 when the filter coefficient of the two-dimensional filter is as shown in A of FIG. 16.

In the amplitude characteristics of noise shaping shown in B of FIG. 16, the gain is 0 at a frequency f=0, and the gain is negative in the low or intermediate frequency band. In addition, the gain rapidly increases in the high frequency band, as compared to the amplitude characteristics of noise shaping by the $\Delta\Sigma$ modulation of the Floyd filter.

Figure 17:
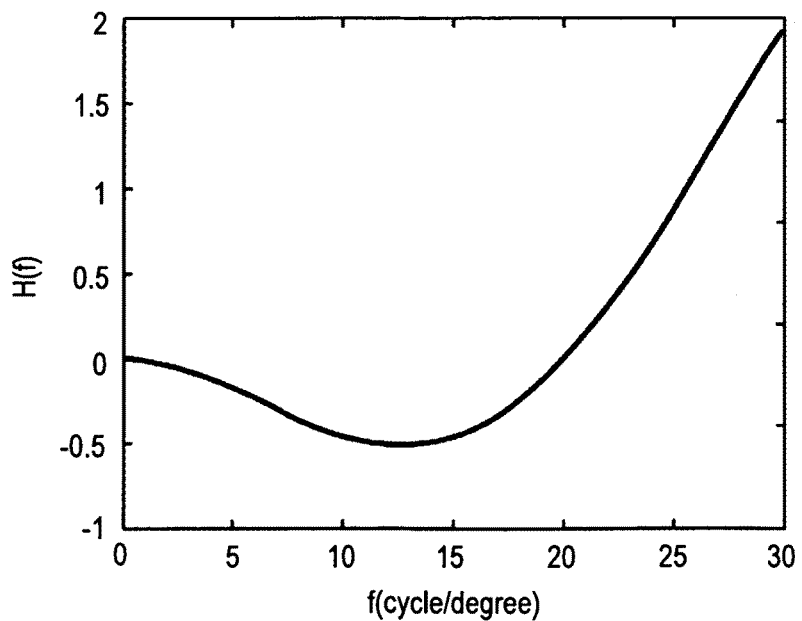
FIG. 17 is a diagram illustrating a third example of the amplitude characteristics of noise shaping and a filter coefficient.

FIG. 17 shows a third example of the filter coefficient and the amplitude characteristics of noise shaping by the $\Delta\Sigma$ modulation of the grayscale modulator 200 shown in FIG. 4 when the maximum frequency of the spatial frequency of the image that can be displayed by the display device for displaying a grayscale-converted image is 30 cpd.

That is, A of FIG. 17 shows a third example of the filter coefficient of a two-dimensional filter (feedback arithmetic unit 240) with 12 taps, which is determined such that the amplitude characteristics of noise shaping by the $\Delta\Sigma$ modulation of the grayscale modulator 200 are negative in a low or intermediate frequency band and rapidly increase in a high frequency band, as compared to the amplitude characteristics of noise shaping by the $\Delta\Sigma$ modulation of the Floyd filter.

In A of FIG. 17, as the filter coefficient of the two-dimensional filter with 12 taps, the following are used: $g(1, 1)=-0.0397$, $g(2, 1)=-0.1586$, $g(3, 1)=-0.2379$, $g(4, 1)=-0.1586$, $g(5, 1)=-0.0397$, $g(1, 2)=-0.1586$, $g(2, 2)=0.2592$, $g(3, 2)=0.8356$, $g(4, 2)=0.2592$, $g(5, 2)=-0.1586$, $g(1, 3)=-0.2379$, and $g(2, 3)=0.8356$.

B of FIG. 17 shows the amplitude characteristics of noise shaping by the $\Delta\Sigma$ modulation of the grayscale modulator 200 when the filter coefficient of the two-dimensional filter is as shown in A of FIG. 17.

In the amplitude characteristics of noise shaping shown in B of FIG. 17, the gain is 0 at a frequency f=0, and the gain is negative in the low or intermediate frequency band. In addition, the gain rapidly increases in the high frequency band, as compared to the amplitude characteristics of noise shaping by the $\Delta\Sigma$ modulation of the Floyd filter.

The filter coefficients of the two-dimensional filters with 12 taps shown in FIGS. 15 to 17 include a negative value. Therefore, the amplitude characteristics of noise shaping are negative in the low or intermediate frequency band. As such, since the amplitude characteristics of noise shaping are negative in the low or intermediate frequency band, it is possible to obtain the amplitude characteristics of noise shaping that rapidly increase in the high frequency band using a two-dimensional filter with a small number of taps, for example, 12 taps.

Simulation are performed on the feedback arithmetic unit 240 (FIG. 4) including the two-dimensional filters with the filter coefficients shown in FIGS. 15 to 17. As a result, all the two-dimensional filters can obtain a grayscale-converted image with high image quality.

[Example of Structure of Computer]

Next, the above-mentioned series of processes may be performed by hardware or software. When the series of processes are performed by software, a program forming the software is installed in, for example, a general-purpose computer.

FIG. 18 shows an example of the structure of a computer according to an embodiment in which the program for executing the above-mentioned series of processes is installed.

The program may be recorded to a hard disk 505, which is a recording medium provided in the computer, or a ROM 503 in advance.

Alternatively, the program may be temporarily or permanently stored (recorded) in a removable recording medium 511, such as a flexible disk, a CD-ROM (compact disc read only memory), an MO (magneto optical) disk, a DVD (digital versatile disc), a magnetic disk, or a semiconductor memory. The removable recording medium 511 may be provided as so-called package software.

In addition, the program may be wirelessly transmitted from a download site to the computer through an artificial satellite for digital satellite broadcasting or it may be transmitted to the computer by wire through a network, such as a LAN (local area network) or the Internet, instead of being installed from the removable recording medium 511 to the computer. The computer may receive the transmitted program using a communication unit 508 and install the received program in the hard disk 505 provided therein.

The computer includes a CPU (central processing unit) 502. An input/output interface 510 is connected to the CPU 502 through a bus 501. When the user operates an input unit 507 including a keyboard, a mouse, and a microphone to input an instruction and the instruction is input to the CPU 502 through the input/output interface 510, the CPU 502 executes the program stored in the ROM (read only memory) 503 according the instruction. Alternatively, the CPU 502 loads to a RAM (random access memory) 504 the program stored in the hard disk 505, the program that has been transmitted from a satellite or a network, received by the communication unit 508 and installed in the hard disk 505, or the program that has been read from the removable recording medium 511 mounted on a drive 509 and installed in the hard disk 505 and executes the program. In this way, the CPU 502 performs the process according to the above-mentioned flowchart or the process executed by the above-mentioned block diagram. The CPU 502 outputs the process result from an output unit 506 including an LCD (liquid crystal display) or a speaker, through the input/output interface 510, transmits it from the communication unit 508, or records it to the hard disk 505, if necessary.

In the specification, steps describing a program for allowing the computer to perform various kinds of processes are not necessarily performed in time series in the order described in the flowchart, but include processes that are performed in parallel or individually (for example, a parallel process or a process by an object).

The program may be processed by one computer or a plurality of distributed computers. In addition, the program may be transmitted to a remote computer and executed by the computer.

The invention is not limited to the above-described embodiment, but various modifications and changes of the invention can be made without departing from the scope and spirit of the invention.

That is, in the image processing apparatus shown in FIG. 4, for example, when the hunting phenomenon does not matter, the stabilizer 100 may not be provided.

The Jarvis filter or the Floyd filter may be used as the filter, which is the feedback arithmetic unit 240 of the image processing apparatus shown in FIG. 4.

The invention claimed is:

1. An image processing apparatus comprising:
a $\Delta\Sigma$ modulation unit that performs $\Delta\Sigma$ modulation on an image to convert the grayscale of the image,
wherein the $\Delta\Sigma$ modulation unit includes:
an arithmetic unit that filters a quantization error;
an adding unit that adds a pixel value of the image and the output of the arithmetic unit;
a quantizing unit that quantizes the output of the adding unit and outputs a quantized value including the quantization error as the result of the $\Delta\Sigma$ modulation; and
a subtracting unit that calculates the difference between the output of the adding unit and the quantized value of the output of the adding unit, thereby calculating the quantization error, and
a filter coefficient of filtering by the arithmetic unit is determined such that the amplitude characteristics of noise shaping by the $\Delta\Sigma$ modulation unit in a frequency band that is equal to or more than an intermediate frequency band are the inverse characteristics of the spatial frequency characteristics of the human eye,
in which at least one of the arithmetic unit, the adding unit, the quantizing unit, and the subtracting unit is configured as a hardware device, and
wherein the filter coefficient of filtering by the arithmetic unit is determined such that the amplitude characteristics of noise shaping in the frequency band that is equal to or more than the intermediate frequency band are the inverse characteristics of the spatial frequency characteristics of the human eye, on the basis of the characteristics of equal to or more than a spatial frequency corresponding to the resolution of a display unit that displays the image subjected to the $\Delta\Sigma$ modulation, among the spatial frequency characteristics of the human eye.

2. A non-transitory computer readable storage medium having stored thereon a program that allows a computer to function as a $\Delta\Sigma$ modulation unit that performs $\Delta\Sigma$ modulation on an image to convert the grayscale of the image,
wherein the $\Delta\Sigma$ modulation unit includes:
an arithmetic unit that filters a quantization error;
an adding unit that adds a pixel value of the image and the output of the arithmetic unit;
a quantizing unit that quantizes the output of the adding unit and outputs a quantized value including the quantization error as the result of the $\Delta\Sigma$ modulation; and
a subtracting unit that calculates the difference between the output of the adding unit and the quantized value of the output of the adding unit, thereby calculating the quantization error, and
a filter coefficient of filtering by the arithmetic unit is determined such that the amplitude characteristics of noise shaping by the $\Delta\Sigma$ modulation unit in a frequency band that is equal to or more than an intermediate frequency band are the inverse characteristics of the spatial frequency characteristics of the human eye,
wherein the filter coefficient of filtering by the arithmetic unit is determined such that the amplitude characteristics of noise shaping in the frequency band that is equal to or more than the intermediate frequency band are the inverse characteristics of the spatial frequency characteristics of the human eye, on the basis of the characteristics of equal to or more than a spatial frequency corresponding to the resolution of a display unit that displays the image subjected to the $\Delta\Sigma$ modulation, among the spatial frequency characteristics of the human eye.

3. An image processing apparatus comprising:
a $\Delta\Sigma$ modulation unit that performs $\Delta\Sigma$ modulation on an image to convert the grayscale of the image,
wherein the $\Delta\Sigma$ modulation unit includes:
an arithmetic unit that filters a quantization error;
an adding unit that adds a pixel value of the image and the output of the arithmetic unit;
a quantizing unit that quantizes the output of the adding unit and outputs a quantized value including the quantization error as the result of the $\Delta\Sigma$ modulation; and
a subtracting unit that calculates the difference between the output of the adding unit and the quantized value of the output of the adding unit, thereby calculating the quantization error, and
a filter coefficient of filtering by the arithmetic unit is determined such that the amplitude characteristics of noise shaping by the $\Delta\Sigma$ modulation unit in a frequency band that is equal to or more than an intermediate frequency band are the inverse characteristics of the spatial frequency characteristics of the human eye,
in which at least one of the arithmetic unit, the adding unit, the quantizing unit, and the subtracting unit is configured as a hardware device, and
wherein the filter coefficient of filtering by the arithmetic unit is determined such that the amplitude characteristics of noise shaping by the $\Delta\Sigma$ modulation unit rapidly increase in a high frequency band, as compared to the amplitude characteristics of noise shaping by the $\Delta\Sigma$ modulation of a Floyd filter.

4. An image processing apparatus comprising:
a $\Delta\Sigma$ modulation unit that performs $\Delta\Sigma$ modulation on an image to convert the grayscale of the image,
wherein the $\Delta\Sigma$ modulation unit includes:
an arithmetic unit that filters a quantization error;
an adding unit that adds a pixel value of the image and the output of the arithmetic unit;
a quantizing unit that quantizes the output of the adding unit and outputs a quantized value including the quantization error as the result of the $\Delta\Sigma$ modulation; and
a subtracting unit that calculates the difference between the output of the adding unit and the quantized value of the output of the adding unit, thereby calculating the quantization error, and a filter coefficient of filtering by the arithmetic unit is determined such that the amplitude characteristics of noise shaping by the ΔΣ modulation unit in a frequency band that is equal to or more than an intermediate frequency band are the inverse characteristics of the spatial frequency characteristics of the human eye, in which at least one of the arithmetic unit, the adding unit, the quantizing unit, and the subtracting unit is configured as a hardware device, and wherein the filter coefficient of filtering by the arithmetic unit is determined such that the amplitude characteristics of noise shaping by the ΔΣ modulation unit are negative in a low or intermediate frequency band and rapidly increase in a high frequency band, as compared to the amplitude characteristics of noise shaping by the ΔΣ modulation of a Floyd filter.

5. An image processing apparatus comprising:
a ΔΣ modulation unit that performs ΔΣ modulation on an image to convert the grayscale of the image,
wherein the ΔΣ modulation unit includes:
an arithmetic unit that filters a quantization error;
an adding unit that adds a pixel value of the image and the output of the arithmetic unit;
a quantizing unit that quantizes the output of the adding unit and outputs a quantized value including the quantization error as the result of the ΔΣ modulation; and
a subtracting unit that calculates the difference between the output of the adding unit and the quantized value of the output of the adding unit, thereby calculating the quantization error, and
a filter coefficient of filtering by the arithmetic unit is determined such that the amplitude characteristics of noise shaping by the ΔΣ modulation unit in a frequency band that is equal to or more than an intermediate frequency band are the inverse characteristics of the spatial frequency characteristics of the human eye,
in which at least one of the arithmetic unit, the adding unit, the quantizing unit, and the subtracting unit is configured as a hardware device, and
wherein the filter coefficient of filtering by the arithmetic unit includes a negative value and is determined such that the amplitude characteristics of noise shaping by the ΔΣ modulation unit rapidly increase in a high frequency band, as compared to the amplitude characteristics of noise shaping by the ΔΣ modulation of a Floyd filter.

6. An image processing method performed in an image processing apparatus including a ΔΣ modulation unit that performs ΔΣ modulation on an image to convert the grayscale of the image, the ΔΣ modulation unit including an arithmetic unit that filters a quantization error, an adding unit that adds a pixel value of the image and the output of the arithmetic unit, a quantizing unit that quantizes the output of the adding unit and outputs a quantized value including the quantization error as the result of the ΔΣ modulation, and a subtracting unit that calculates the difference between the output of the adding unit and the quantized value of the output of the adding unit, thereby calculating the quantization error, the image processing method comprising the steps of:

allowing the adding unit to add the pixel value of the image and the output of the arithmetic unit;

allowing the quantizing unit to quantize the output of the adding unit and output the quantized value including the quantization error as the result of the ΔΣ modulation;

allowing the subtracting unit to calculate the difference between the output of the adding unit and the quantized value of the output of the adding unit, thereby calculating the quantization error; and allowing the arithmetic unit to filter the quantization error and output the filtering result to the adding unit, wherein a filter coefficient of filtering by the arithmetic unit is determined such that the amplitude characteristics of noise shaping by the ΔΣ modulation unit in a frequency band that is equal to or more than an intermediate frequency band are the inverse characteristics of the spatial frequency characteristics of the human eye, and wherein the filter coefficient of filtering by the arithmetic unit is determined such that the amplitude characteristics of noise shaping in the frequency band that is equal to or more than the intermediate frequency band are the inverse characteristics of the spatial frequency characteristics of the human eye, on the basis of the characteristics of equal to or more than a spatial frequency corresponding to the resolution of a display unit that displays the image subjected to the ΔΣ modulation, among the spatial frequency characteristics of the human eye.

7. An image processing apparatus comprising:
an identity detecting unit that detects whether a pixel value of an interesting pixel is identical to a pixel value of a pixel around the interesting pixel in an image;
a noise generating unit that generates a random noise;
a first adding unit that adds the random noise to the pixel value of the interesting pixel and outputs the added value as the pixel value of the interesting pixel when it is detected that the pixel values are identical to each other, and outputs the pixel value of the interesting pixel without any change in the other cases; and
a ΔΣ modulation unit that performs ΔΣ modulation on the image to convert the grayscale of the image,
wherein the ΔΣ modulation unit includes:
an arithmetic unit that filters a quantization error;
a second adding unit that adds the pixel value of the interesting image output from the first adding unit and the output of the arithmetic unit;
a quantizing unit that quantizes the output of the second adding unit and outputs a quantized value including the quantization error as the result of the ΔΣ modulation; and
a subtracting unit that calculates the difference between the output of the second adding unit and the quantized value of the output of the second adding unit, thereby calculating the quantization error,
in which at least one of the arithmetic unit, the second adding unit, the quantizing unit, and the subtracting unit is configured as a hardware device.

8. The imaging processing apparatus according to claim 7, wherein a filter coefficient of filtering by the arithmetic unit is determined such that the amplitude characteristics of noise shaping by the ΔΣ modulation unit in a frequency band that is equal to or more than an intermediate frequency band are the inverse characteristics of the spatial frequency characteristics of the human eye.

9. The image processing apparatus according to claim 8, wherein the filter coefficient of filtering by the arithmetic unit includes a negative value and is determined such that the amplitude characteristics of noise shaping by the ΔΣ modulation unit rapidly increase in a high frequency band, as compared to the amplitude characteristics of noise shaping by the ΔΣ modulation of a Floyd filter.

10. The image processing apparatus according to claim 8, wherein the filter coefficient of filtering by the arithmetic unit is determined such that the amplitude characteristics of noise shaping in the frequency band that is equal to or more than the intermediate frequency band are the inverse characteristics of the spatial frequency characteristics of the human eye, on the basis of the characteristics of equal to or more than a spatial frequency corresponding to the resolution of a display unit that displays the image subjected to the ΔΣ modulation, among the spatial frequency characteristics of the human eye.

11. The image processing apparatus according to claim 8, wherein the filter coefficient of filtering by the arithmetic unit is determined such that the amplitude characteristics of noise shaping by the ΔΣ modulation unit rapidly increase in a high frequency band, as compared to the amplitude characteristics of noise shaping by the ΔΣ modulation of a Floyd filter.

12. The image processing apparatus according to claim 8, wherein the filter coefficient of filtering by the arithmetic unit is determined such that the amplitude characteristics of noise shaping by the ΔΣ modulation unit are negative in a low or intermediate frequency band and rapidly increase in a high frequency band, as compared to the amplitude characteristics of noise shaping by the ΔΣ modulation of a Floyd filter.

13. A non-transitory computer readable storage medium having stored thereon a program that allows a computer to function as:
   an identity detecting unit that detects whether a pixel value of an interesting pixel is identical to a pixel value of a pixel around the interesting pixel in an image;
   a noise generating unit that generates a random noise;
   a first adding unit that adds the random noise to the pixel value of the interesting pixel and outputs the added value as the pixel value of the interesting pixel when it is detected that the pixel values are identical to each other, and outputs the pixel value of the interesting pixel without any change in the other cases; and
   a ΔΣ modulation unit that performs ΔΣ modulation on the image to convert the grayscale of the image,
   wherein the ΔΣ modulation unit includes:
   an arithmetic unit that filters a quantization error;
   a second adding unit that adds the pixel value of the interesting image output from the first adding unit and the output of the arithmetic unit;
   a quantizing unit that quantizes the output of the second adding unit and outputs a quantized value including the quantization error as the result of the ΔΣ modulation; and
   a subtracting unit that calculates the difference between the output of the second adding unit and the quantized value of the output of the second adding unit, thereby calculating the quantization error,
   in which at least one of the arithmetic unit, the second adding unit, the quantizing unit, and the subtracting unit is configured as a hardware device.

14. An image processing method performed in an image processing apparatus including an identity detecting unit that detects whether a pixel value of an interesting pixel is identical to a pixel value of a pixel around the interesting pixel in an image, a noise generating unit that generates a random noise, a first adding unit that adds the random noise to the pixel value of the interesting pixel and outputs the added value as the pixel value of the interesting pixel when it is detected that the pixel values are identical to each other and outputs the pixel value of the interesting pixel without any change in the other cases, and a ΔΣ modulation unit that performs ΔΣ modulation on the image to convert the grayscale of the image, the ΔΣ modulation unit including an arithmetic unit that filters a quantization error, a second adding unit that adds the pixel value of the interesting image output from the first adding unit and the output of the arithmetic unit, a quantizing unit that quantizes the output of the second adding unit and outputs a quantized value including the quantization error as the result of the ΔΣ modulation, and a subtracting unit that calculates the difference between the output of the second adding unit and the quantized value of the output of the second adding unit, thereby calculating the quantization error, the image processing method comprising the steps of:
   allowing the first adding unit to add the random noise to the pixel value of the interesting pixel and output the added value as the pixel value of the interesting pixel when it is detected that the pixel values are identical to each other, and to output the pixel value of the interesting pixel without any change in the other cases;
   allowing the second adding unit to add the pixel value of the interesting image output from the first adding unit and the output of the arithmetic unit;
   allowing the quantizing unit to quantize the output of the second adding unit and output the quantized value including the quantization error as the result of the ΔΣ modulation;
   allowing the subtracting unit to calculate the difference between the output of the second adding unit and the quantized value of the output of the second adding unit, thereby calculating the quantization error; and
   allowing the arithmetic unit to filter the quantization error and output the filtering result to the second adding unit.

* * * * *